Figure 1:
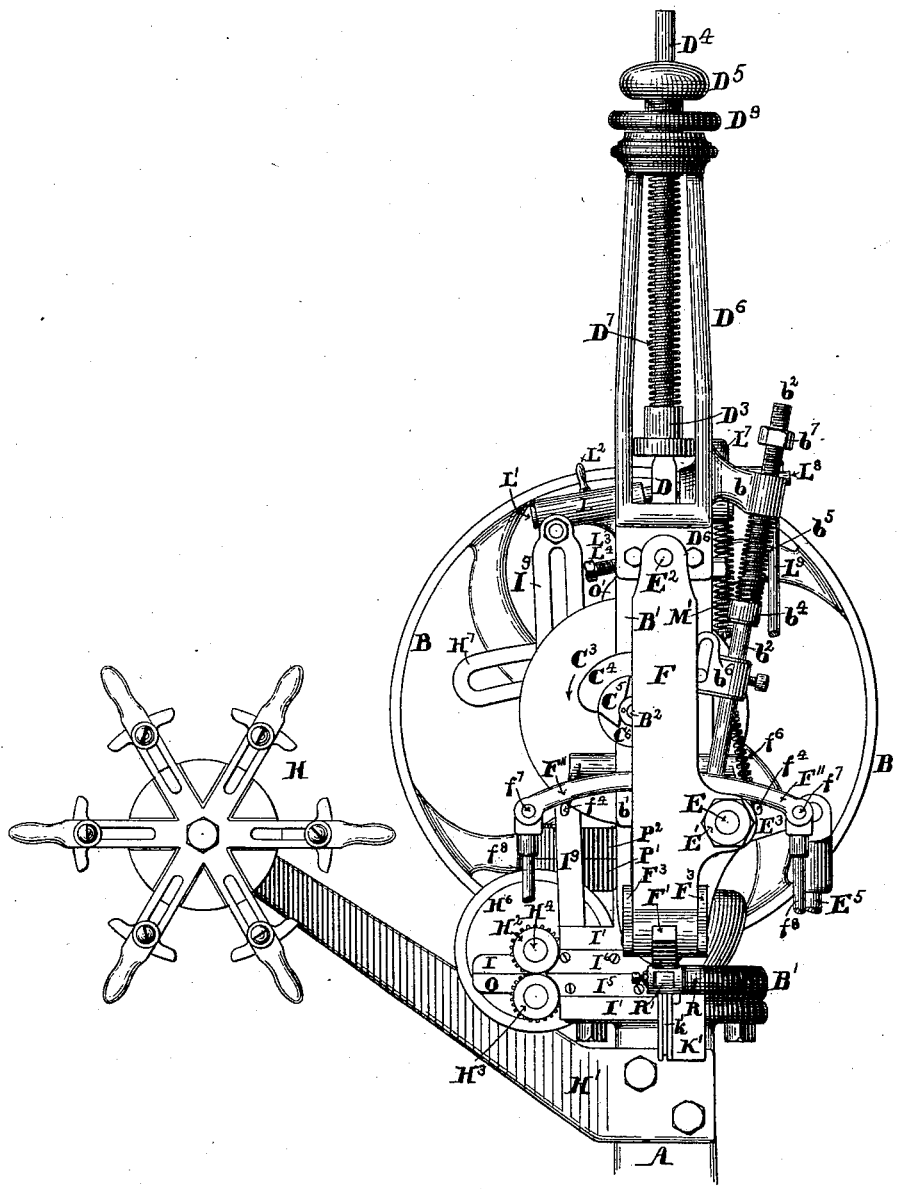

(No Model.) 15 Sheets—Sheet 1.

I. FRECHETTE.
LASTING MACHINE.

No. 482,349. Patented Sept. 13, 1892.

Witnesses:
Walter E. Lombard.
Robert B. Edes.

Inventor:
Isaïe Frechette,
by N. C. Lombard
Attorney.

(No Model.) 15 Sheets—Sheet 2.
I. FRECHETTE.
LASTING MACHINE.

No. 482,349. Patented Sept. 13, 1892.

Witnesses:
Walter E. Lombard
Robert B. Edes

Inventor:
Isaïe Frechette.
by N. C. Lombard
Attorney.

(No Model.) 15 Sheets—Sheet 4.
I. FRECHETTE.
LASTING MACHINE.

No. 482,349. Patented Sept. 13, 1892.

Witnesses:
Walter E. Lombard
Robert B. Edes

Inventor:
Isaïe Frechette,
by N. C. Lombard
Attorney.

(No Model.) 15 Sheets—Sheet 6.

I. FRECHETTE.
LASTING MACHINE.

No. 482,349. Patented Sept. 13, 1892.

Witnesses:
Walter E. Lombard
Robert B. Edes

Inventor:
Isaïe Frechette,
by N. C. Lombard
Attorney.

(No Model.) 15 Sheets—Sheet 7.
I. FRECHETTE.
LASTING MACHINE.
No. 482,349. Patented Sept. 13, 1892.
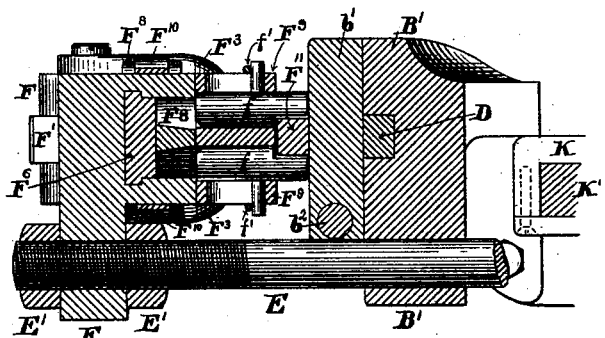
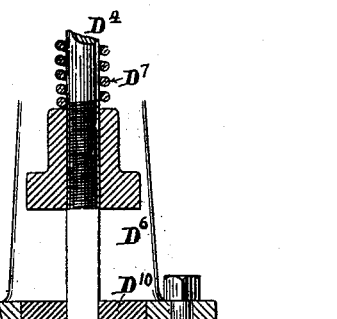
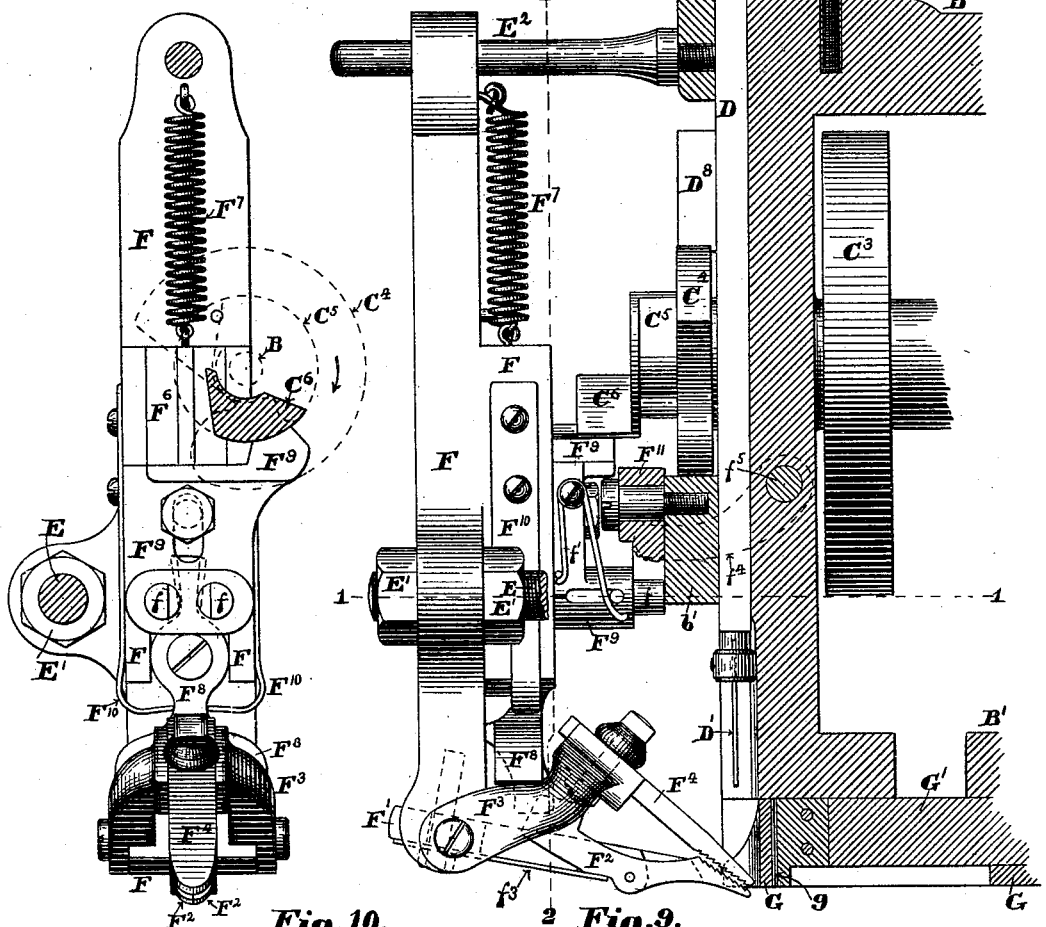
Fig. 11.
Fig. 10.   Fig. 9.
Witnesses:
Walter E. Lombard.
Robert B. Edes
Inventor:
Isaïe Frechette,
by N. C. Lombard
Attorney.

(No Model.) 15 Sheets—Sheet 8.
I. FRECHETTE.
LASTING MACHINE.
No. 482,349. Patented Sept. 13, 1892.
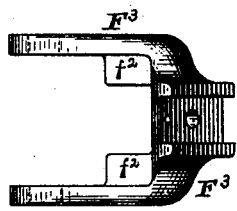
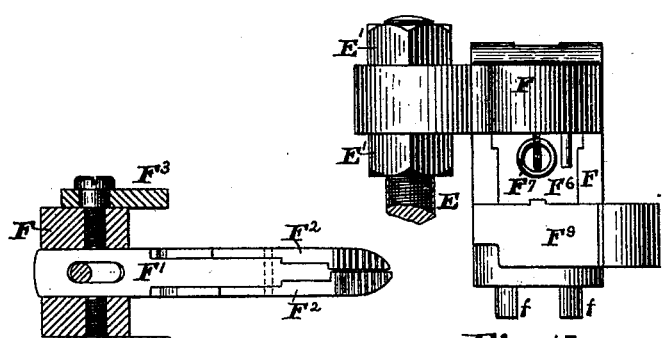
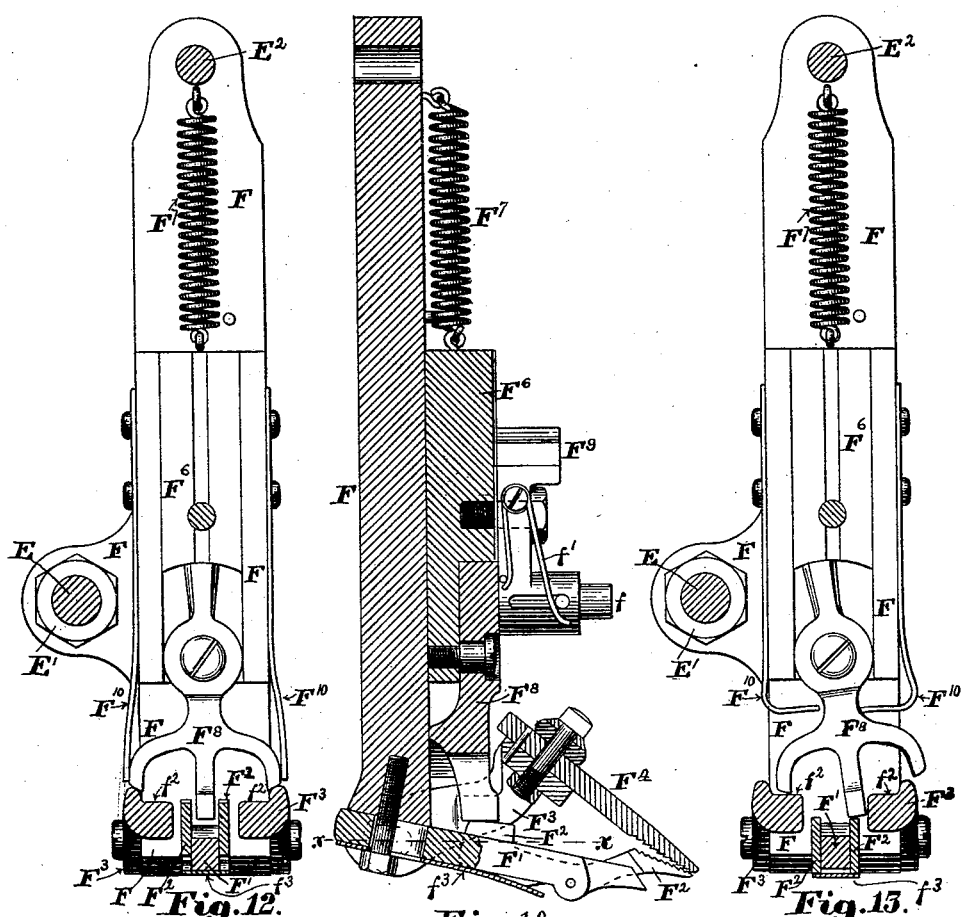
Witnesses:
Walter E. Lombard.
Robert B. Edes
Inventor:
Isaïe Frechette,
by N. C. Lombard
Attorney.

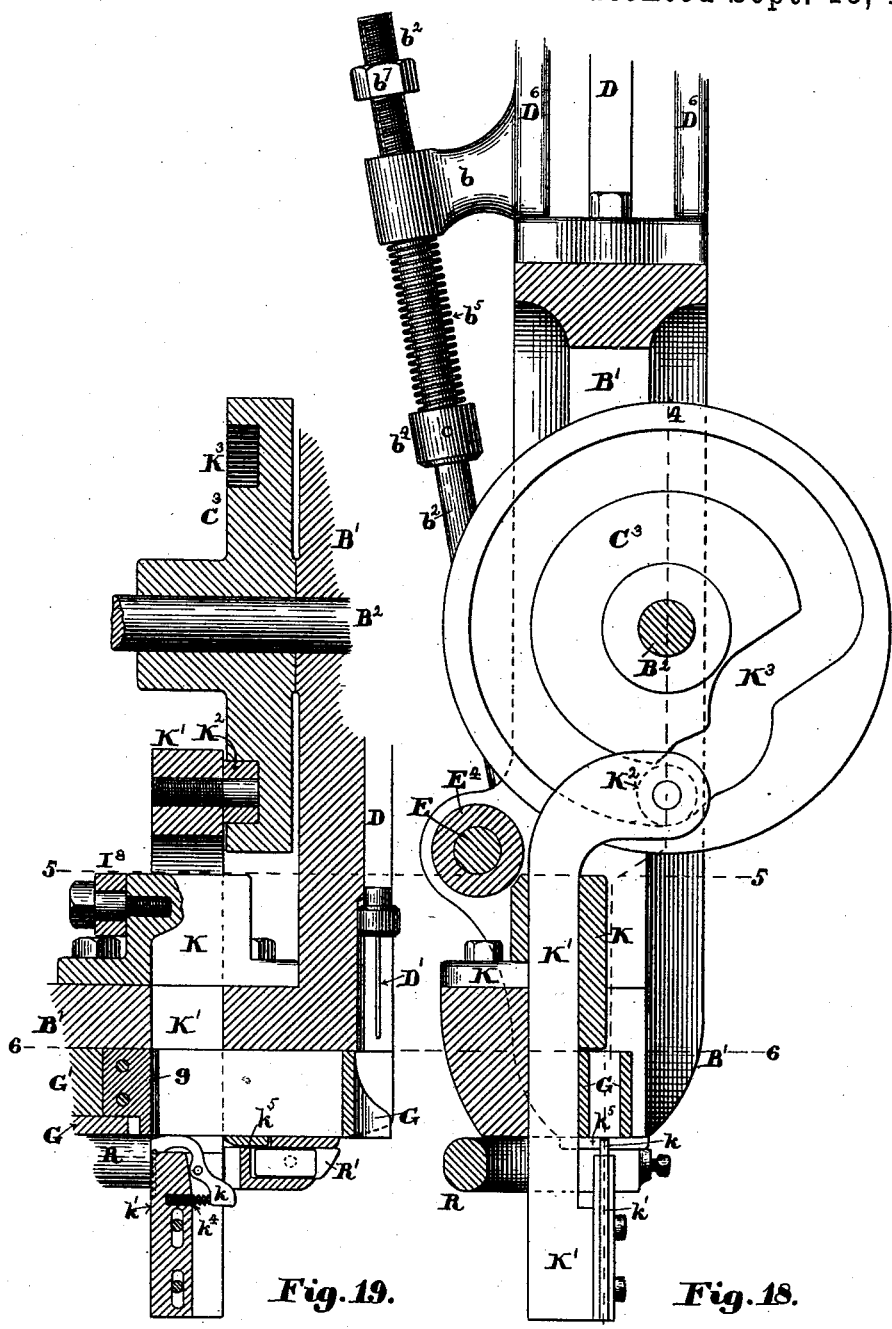

(No Model.) 15 Sheets—Sheet 10.

I. FRECHETTE.
LASTING MACHINE.

No. 482,349. Patented Sept. 13, 1892.

Witnesses:
Walter E. Lombard.
Robert B. Edes.

Inventor:
Isaïe Frechette,
by N. C. Lombard
Attorney.

(No Model.) 15 Sheets—Sheet 11.
I. FRECHETTE.
LASTING MACHINE.

No. 482,349. Patented Sept. 13, 1892.

Witnesses:
Walter E. Lombard.
Robert B. Edes.

Inventor:
Isaïe Frechette,
by N. C. Lombard
Attorney.

(No Model.) 15 Sheets—Sheet 12.
I. FRECHETTE.
LASTING MACHINE.
No. 482,349. Patented Sept. 13, 1892.
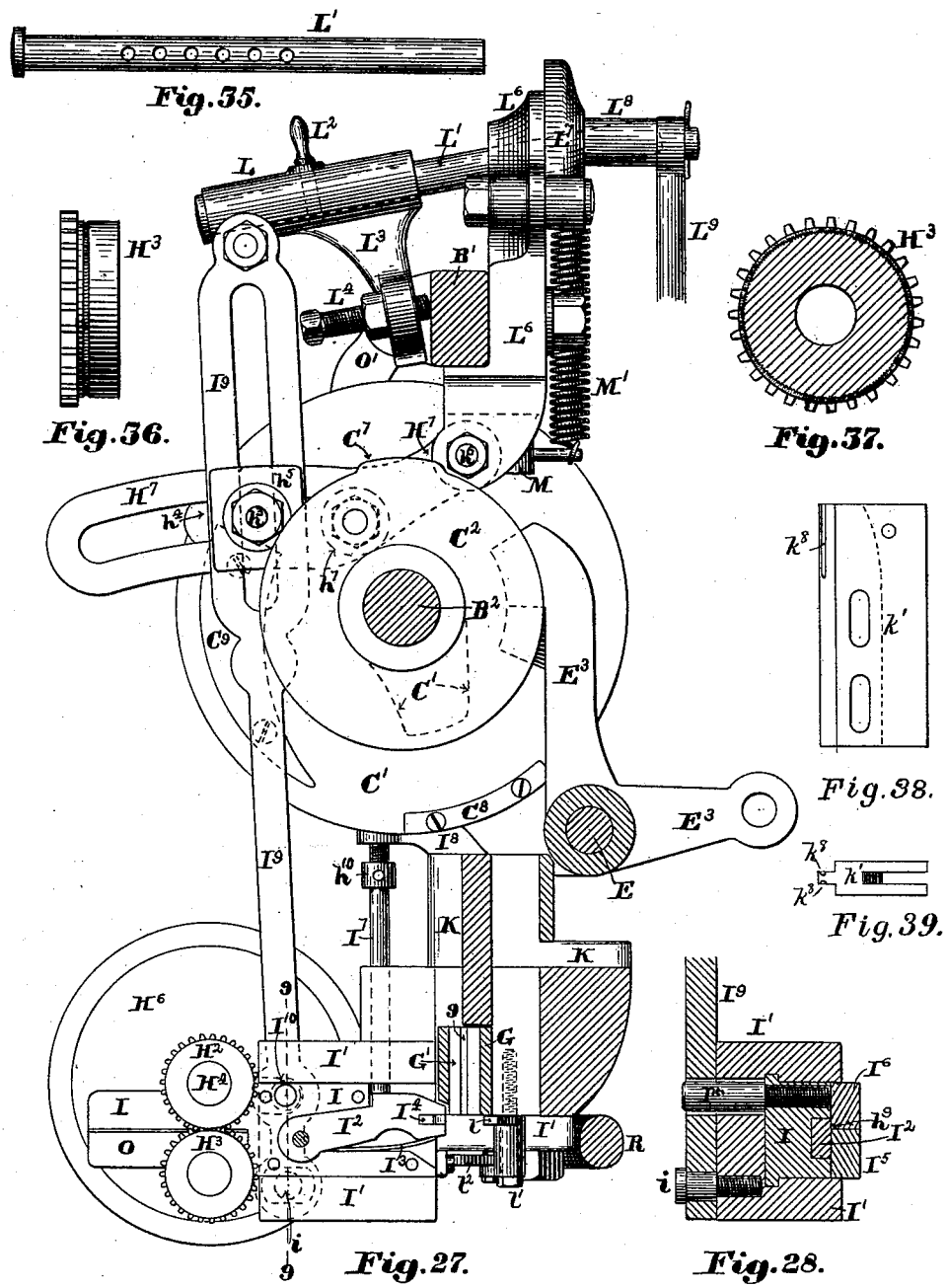
Witnesses:
Walter E. Lombard
Robert B. Edes.
Inventor:
Isaïe Frechette,
by N. C. Lombard
Attorney.

(No Model.) 15 Sheets—Sheet 13.

I. FRECHETTE.
LASTING MACHINE.

No. 482,349. Patented Sept. 13, 1892.

Witnesses:
Walter E. Lombard
Robert B. Edes

Inventor:
Isaïe Frechette,
by N. C. Lombard
Attorney.

(No Model.) 15 Sheets—Sheet 14.
I. FRECHETTE.
LASTING MACHINE.
No. 482,349. Patented Sept. 13, 1892.
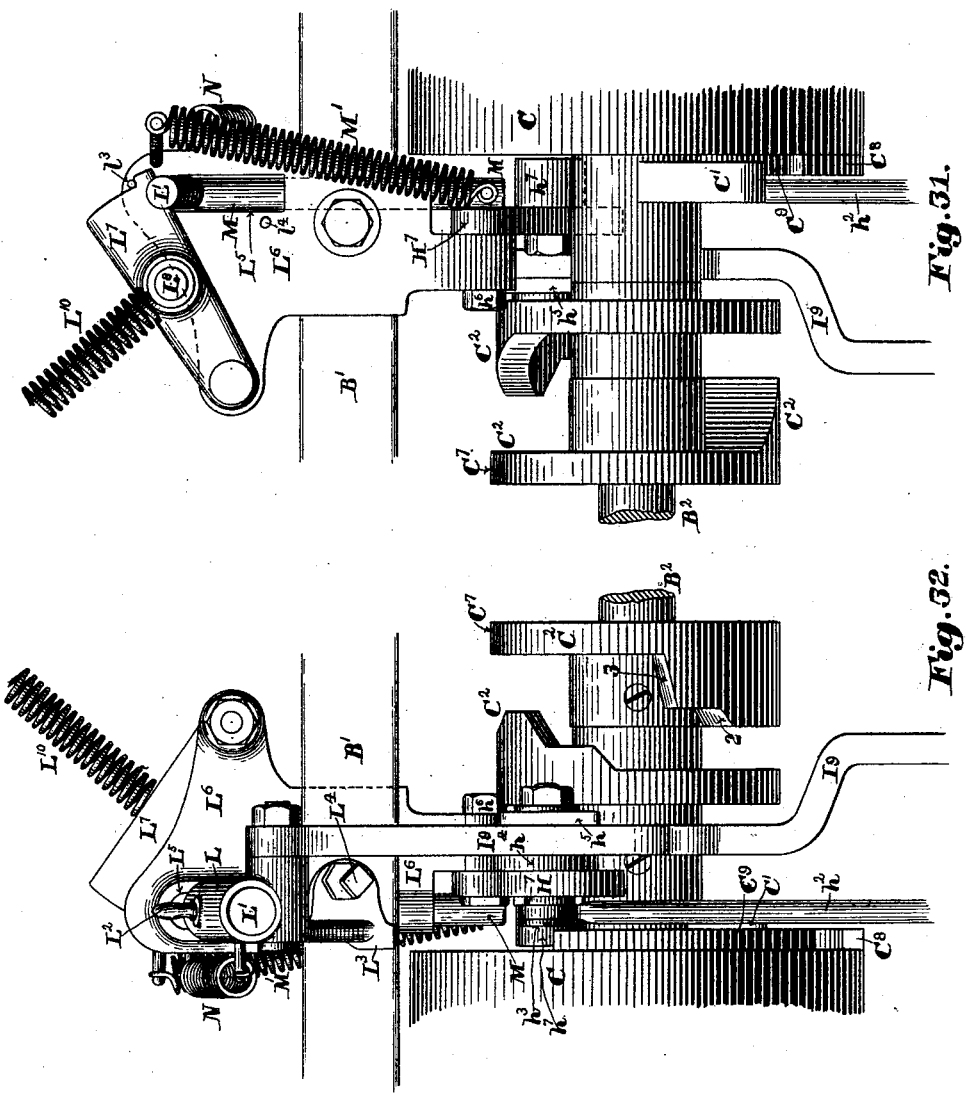
Witnesses:
Walter E. Lombard
Robert B. Edes
Inventor:
Isaïe Frechette,
by N. C. Lombard
Attorney.

(No Model.) 15 Sheets—Sheet 15.
I. FRECHETTE.
LASTING MACHINE.

No. 482,349. Patented Sept. 13, 1892.

Witnesses:
Walter E. Lombard.
Robert B. Edes

Inventor:
Isaïe Frechette,
by N. C. Lombard
Attorney.

UNITED STATES PATENT OFFICE.

ISAÏE FRECHETTE, OF MONTREAL, CANADA.

LASTING-MACHINE.

SPECIFICATION forming part of Letters Patent No. 482,349, dated September 13, 1892.

Application filed April 30, 1892. Serial No. 431,269. (No model.)

*To all whom it may concern:*

Be it known that I, ISAÏE FRECHETTE, of Montreal, in the Province of Quebec and Dominion of Canada, have invented certain new and useful Improvements in Lasting-Machines, of which the following, taken in connection with the accompanying drawings, is a specification.

This invention relates to lasting-machines, and is an improvement upon that class of lasting-machines in which the last is held in the hands of the operator while the edge of the upper is seized by pinchers and drawn over the last in a position for the hammer to drive the nail or fastening, said pinchers operating successively upon different parts of the upper, as in lasting by hand.

This invention consists in certain novel features of construction, arrangement, and combination of parts, which will be best understood by reference to the description of the drawings, and to the claims to be hereinafter given.

Figure 2:
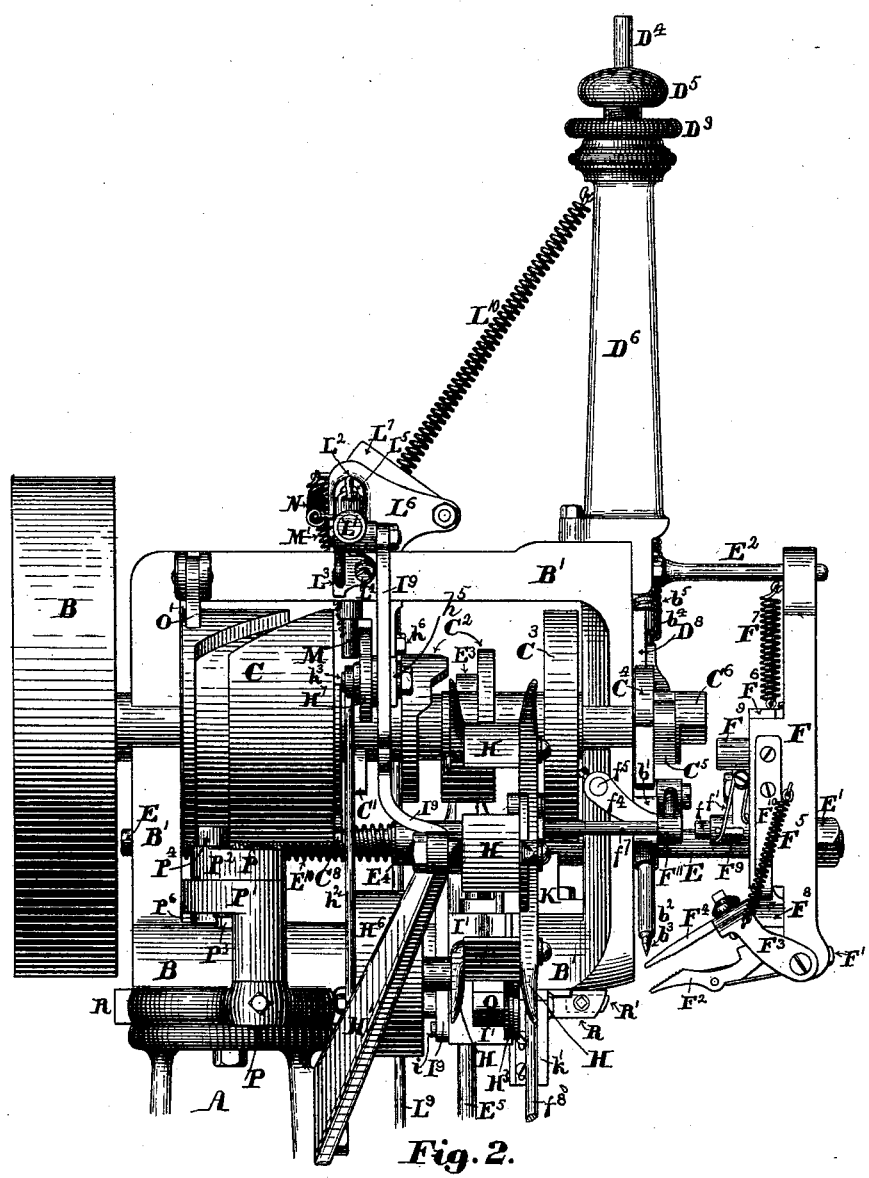
Figure 3:
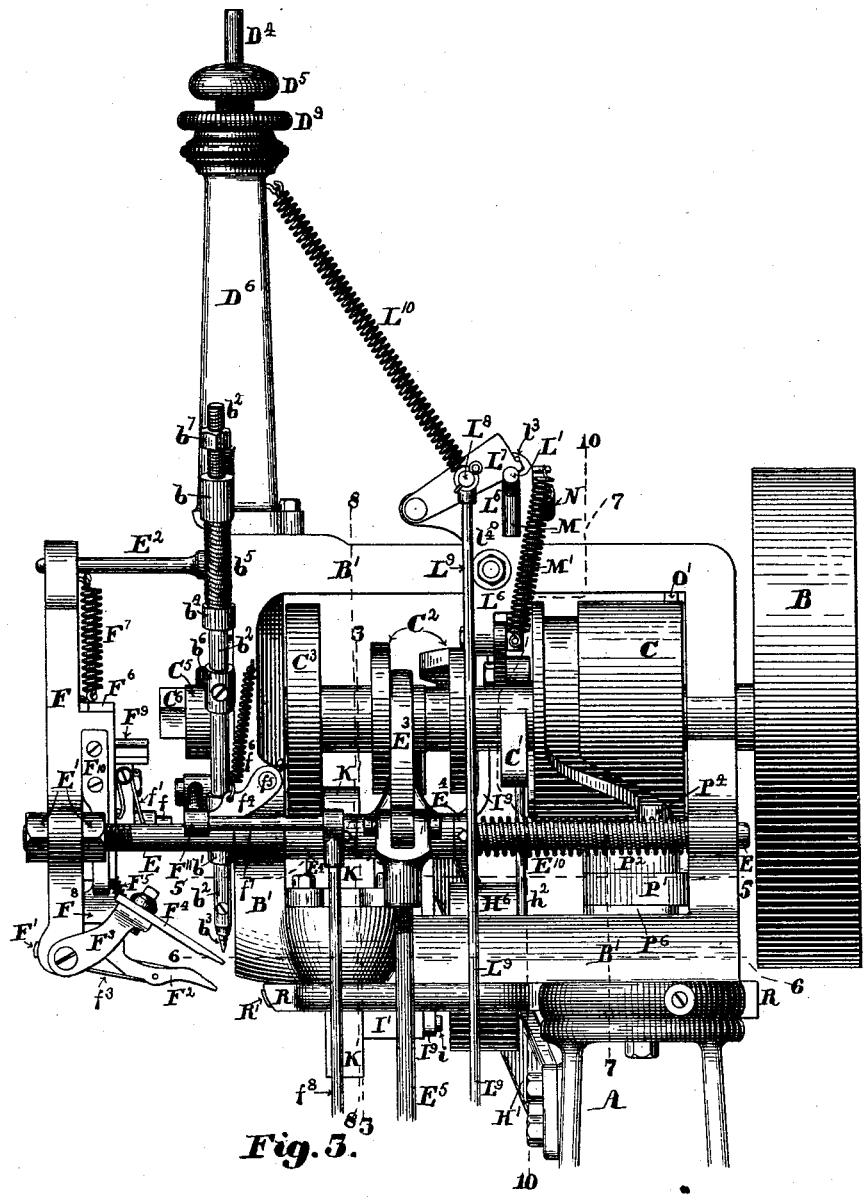
Figure 4:
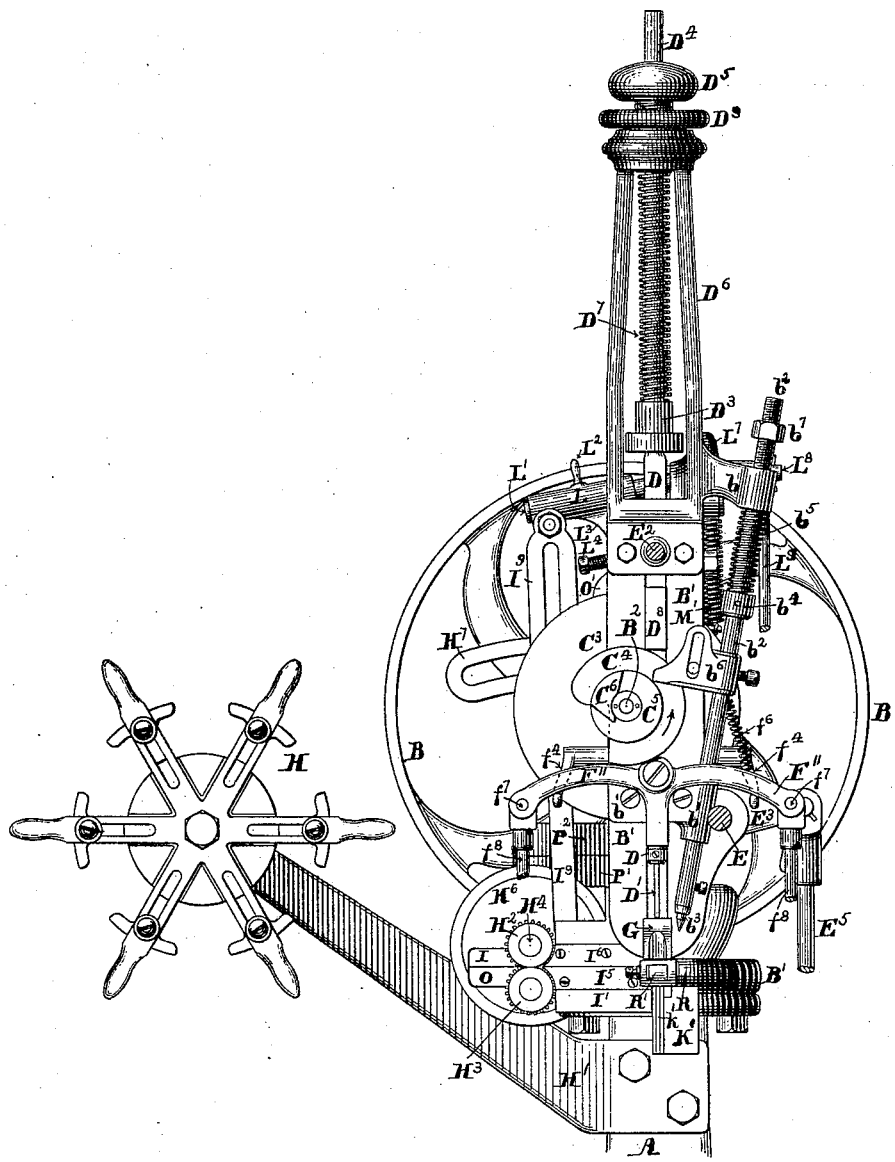
Figures 5, 6:
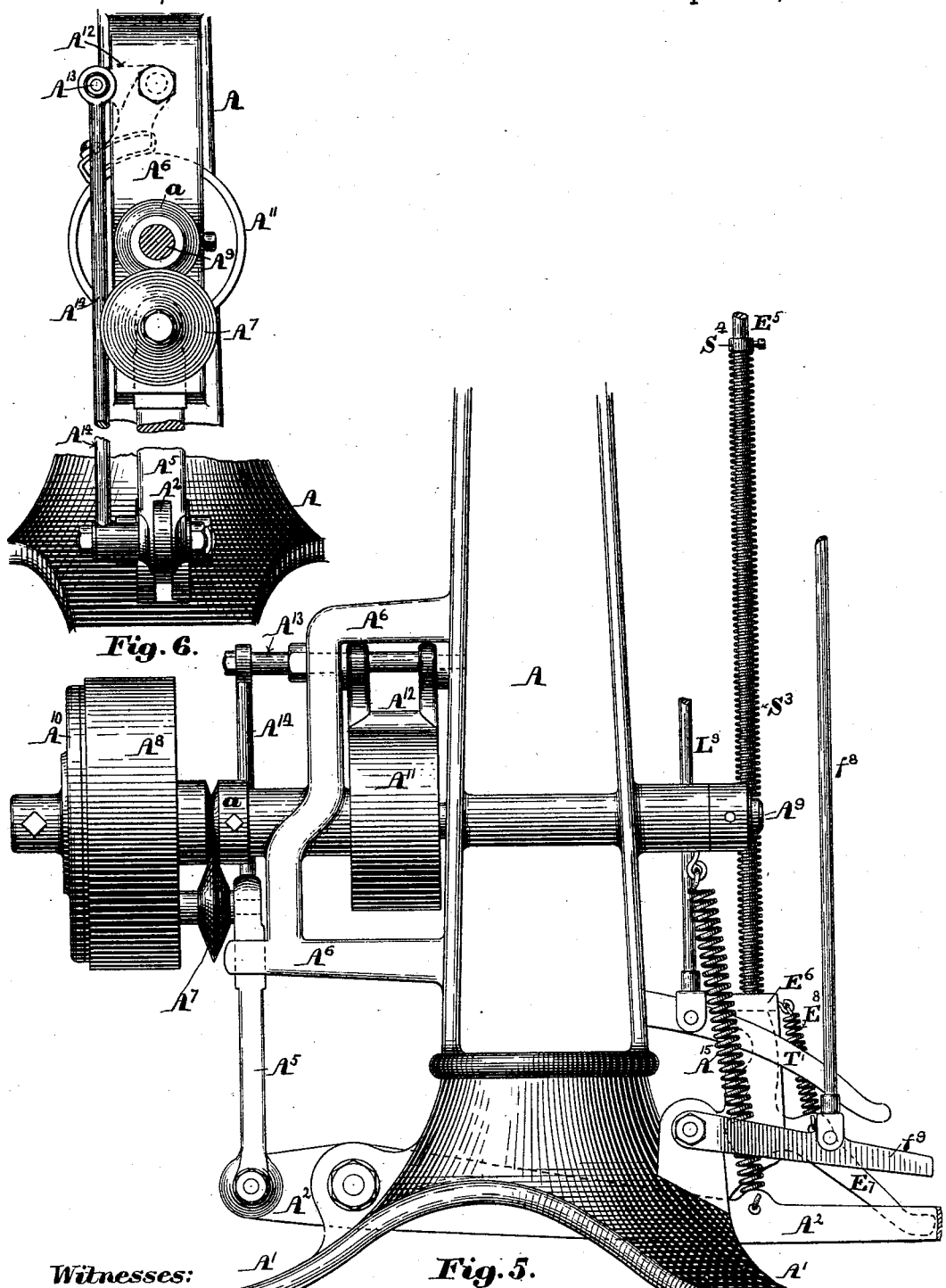
Figure 8:
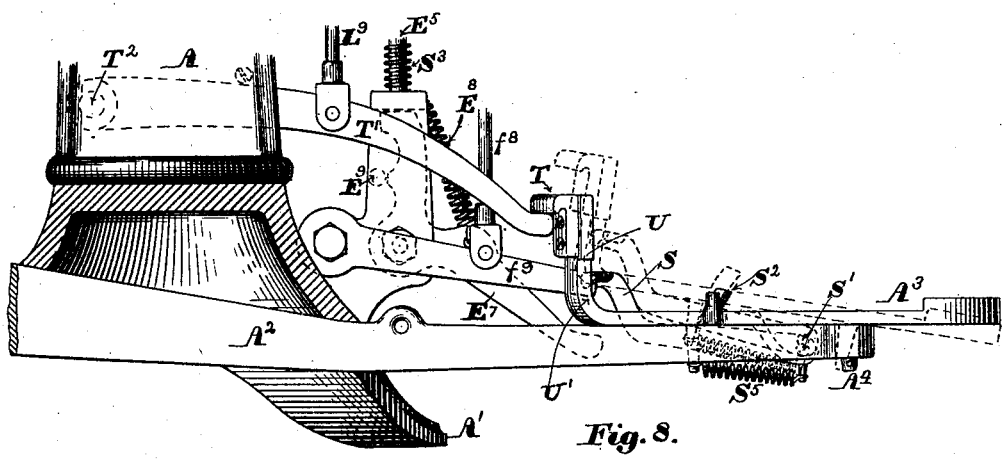
Figure 7:
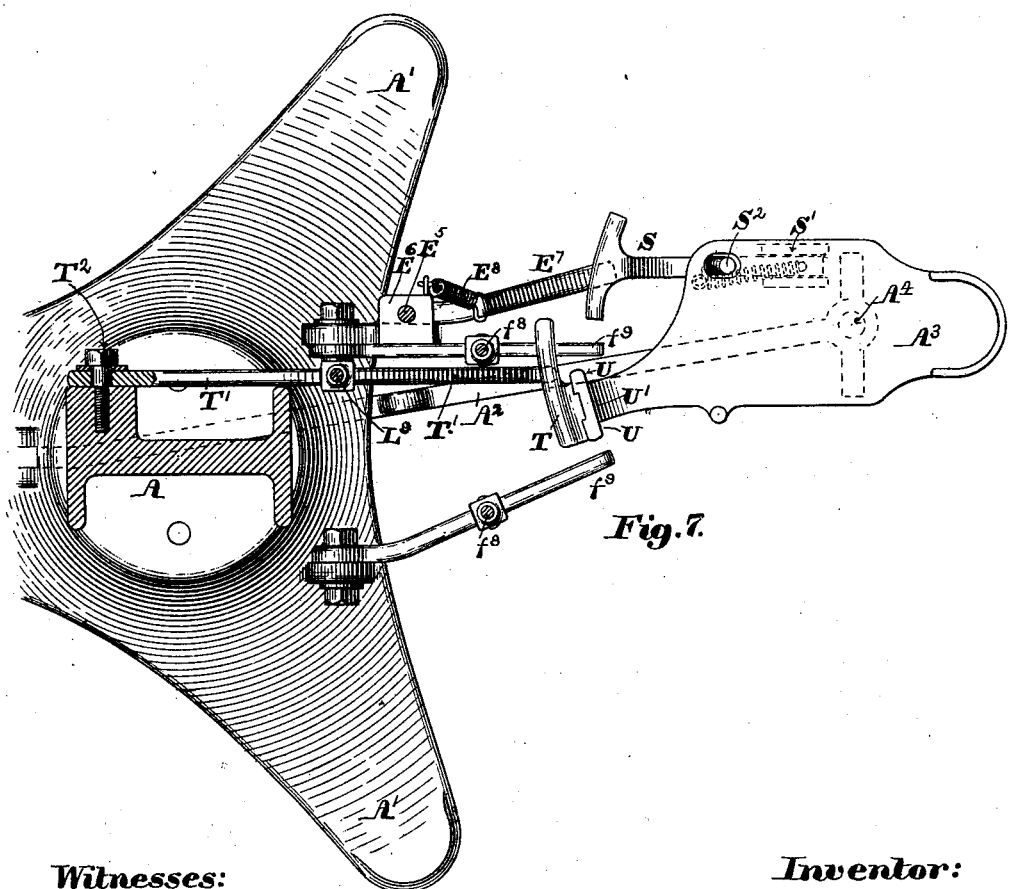
Figures 21, 22, 23:
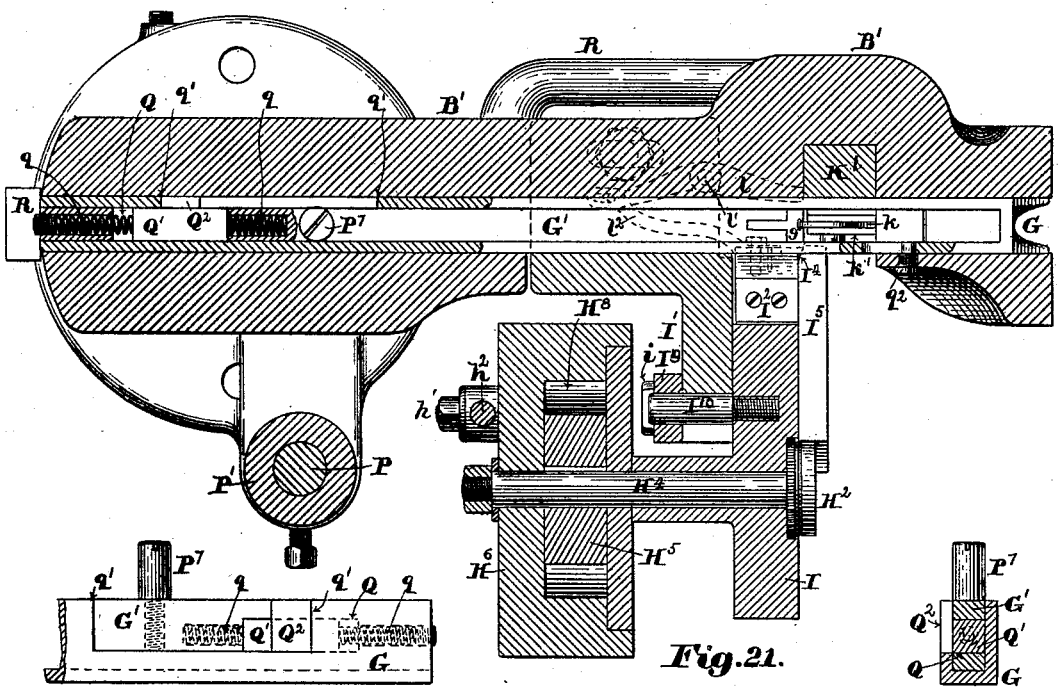
Figures 20, 24, 25:
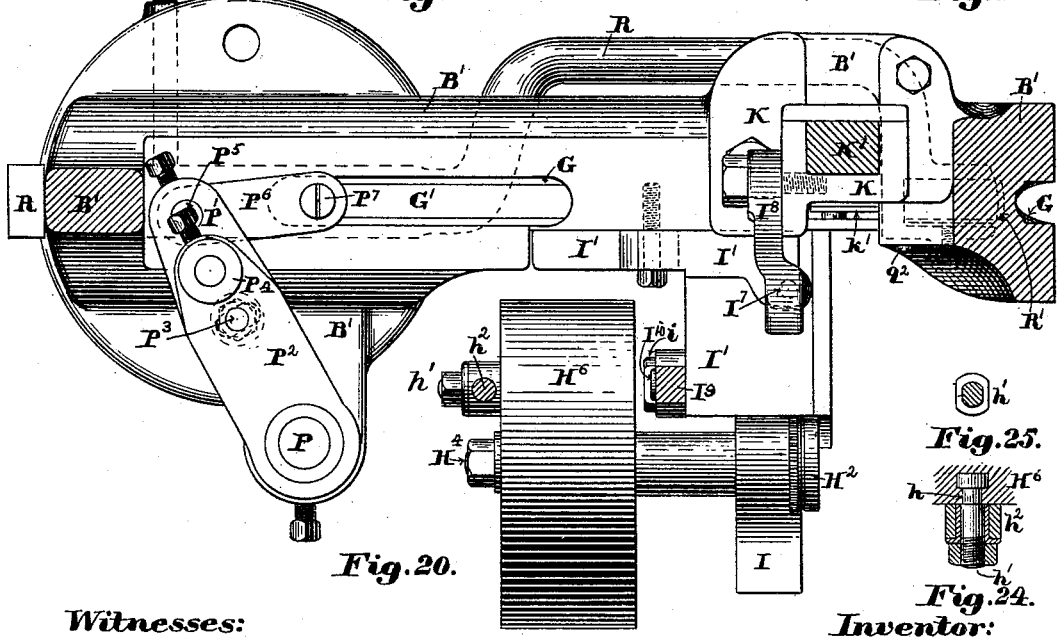
Figure 26:
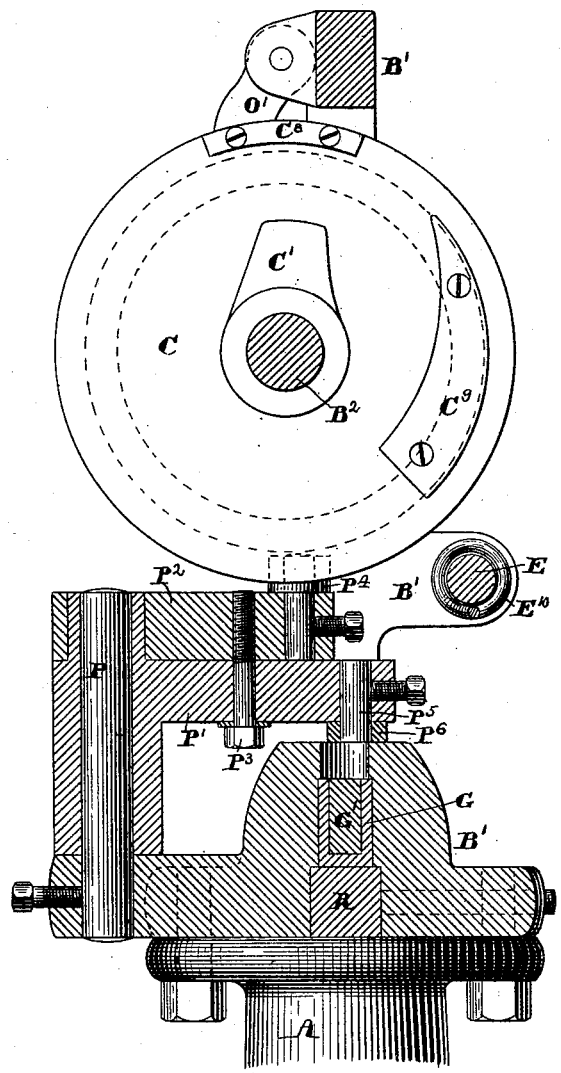
Figures 29, 30:
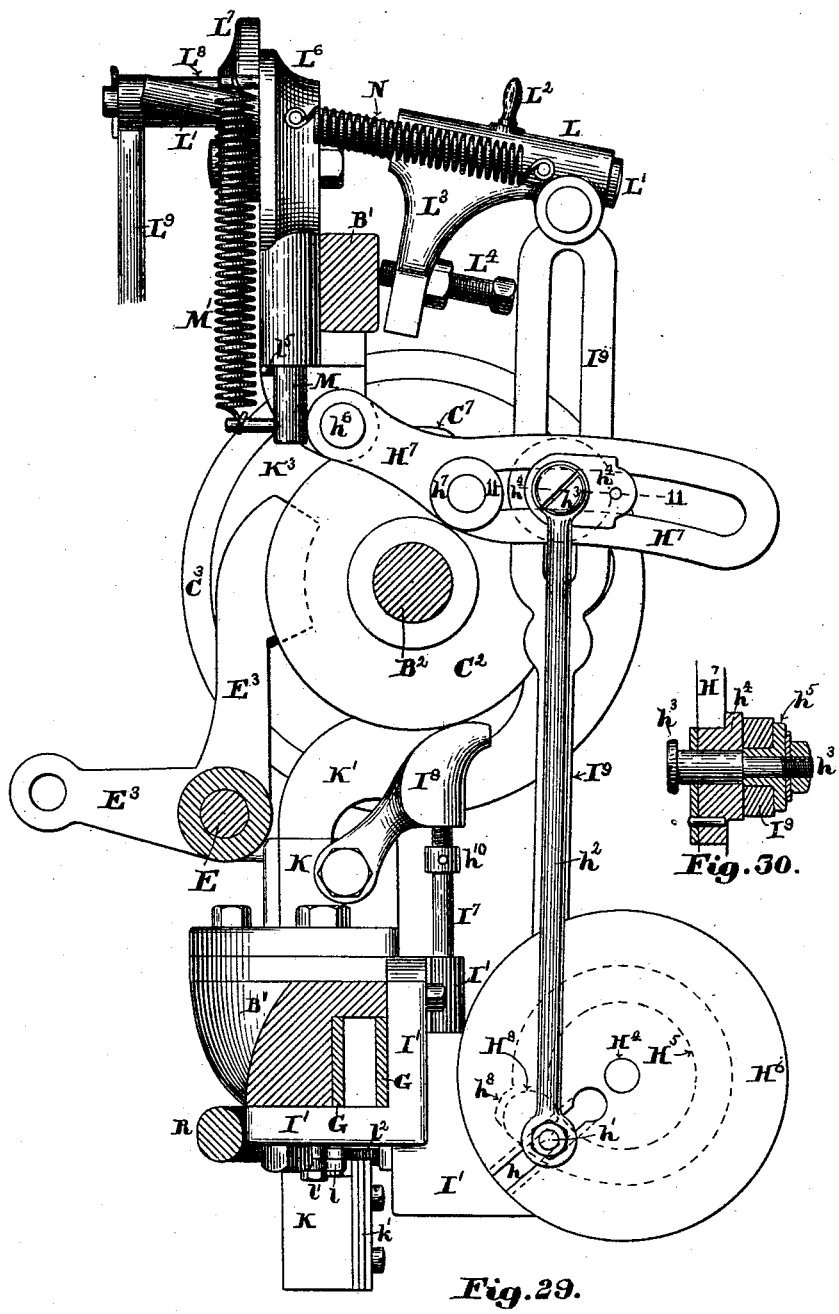
Figure 33:
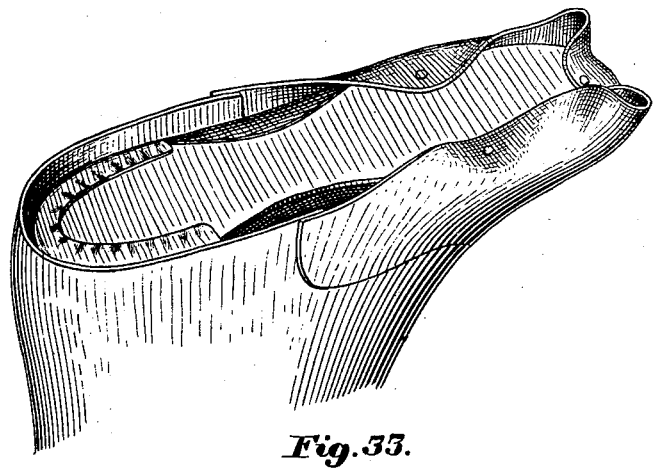
Figure 34:
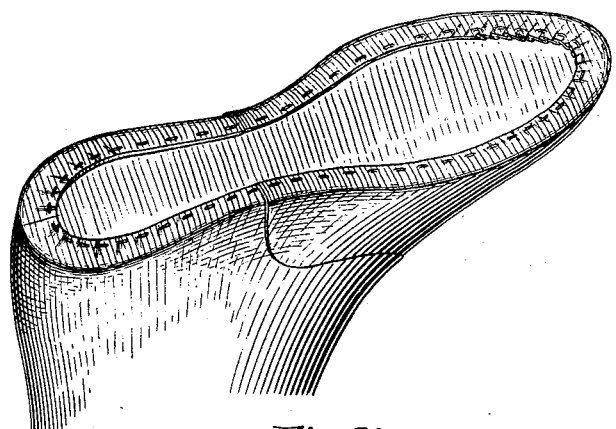

In the drawings, Figure 1 represents a front elevation of the head of the machine. Fig. 2 represents a left-side elevation. Fig. 3 represents a right-side elevation, and Fig. 4 represents a front elevation of the same with the pinchers and their carrying-bar cut away. Fig. 5 represents a left-side elevation of the lower portion of the column for supporting the head with a portion of the front end of the main treadle-lever broken away. Fig. 6 represents an elevation of a portion of the lower end of said column with the friction-pulley cut away. Fig. 7 represents a sectional plan of the base of said column, showing the system of treadles and levers for operating by foot some of the mechanisms upon the head of the machine, the rear leg of said base being broken away. Fig. 8 represents a sectional elevation of the same parts. Figs. 1 to 8 are drawn to one scale, while the remaining figures are drawn to an enlarged scale. Fig. 9 represents a vertical section through the front portion of the head of the machine, showing the pincher-carrying bar in elevation and moved toward the rear of the machine into engagement with the operating-cams, so that the pinchers are in position to grip the upper. Fig. 10 represents a rear elevation of the pincher-carrying bar with its carrying-rod, its guide-rod, and the pincher-operating cam shown in section. Fig. 11 represents a sectional plan of the same parts, the cutting-plane being on the line 1 1 on Fig. 9. Fig. 12 represents a sectional elevation with the pincher-operating lever in its central position, the cutting-plane being on line 2 2 on Fig. 9 and looking toward the front of the machine. Fig. 13 represents the same parts with the pincher-operating lever in position to operate only one of the side jaws of the gripping-pinchers. Fig. 14 represents a central vertical section of the same with one of the lower pincher-jaws in position to co-operate with the upper jaw to crimp the leather of the upper. Fig. 15 represents a plan of the same with the pincher-jaws removed. Fig. 16 represents a sectional plan of the same, the cutting-plane being on line $x$ $x$ on Fig. 14, and showing the lower pincher-jaws and their carrier-arm in plan. Fig. 17 represents a plan of the saddle or carrier for the upper pincher-jaw. Fig. 18 represents a partial sectional elevation of the front portion of the head, looking toward the front of the machine, and showing the device for lifting and bending the fastening-wire and the cam for operating the same, the cutting-plane being on line 3 3 on Fig. 3. Fig. 19 represents a partial sectional elevation of the same parts, the cutting-plane being on line 4 4 on Fig. 18. Fig. 20 represents a sectional plan of the head of the machine, the cutting-plane being on line 5 5 on Figs. 3, 18, and 19. Fig. 21 represents a similar view, the cutting-plane being on line 6 6 on Figs. 3, 18, and 19. Fig. 22 represents a side elevation of a portion of the rear ends of the slides for carrying and holding the fastening while being driven and for turning down the upper upon the inner sole. Fig. 23 represents a cross-section of the same. Figs. 24 and 25 represent details to be hereinafter referred to. Fig. 26 represents a sectional elevation of the head, looking toward the rear of the same, and showing the device for operating the fastening-carrying slide, the cutting-plane being on line 7 7 on Fig. 3. Fig. 27 represents a sectional elevation of the head, looking toward the rear thereof, and showing principally the devices for cutting and regulating the length of the fastening, the cutting-plane being on line 8 8 on Fig. 3. Fig. 28 represents a vertical section of the cutter-carrying slide and its bearing, the cutting-plane being on line 9 9 on Fig. 27. Fig. 29 represents a sectional elevation of the head, looking toward the front of the machine, and showing, mainly, the devices for regulating the length of the wire to form a fastening, the cutting-plane being on line 10 10 on Fig. 3. Fig. 30 represents a sectional elevation of the sliding blocks and pin connecting the lever $H^7$ and rods $I^9$ and $h^2$, the cutting-plane being on line 11 11 on Fig. 29. Figs. 31 and 32 represent side elevations of the devices for regulating the length of the nail, viewed, respectively, from the left and from the right. Figs. 33 and 34 represent, respectively, the shoe-upper upon the last preparatory to lasting and the same after the operation has been performed. Fig. 35 represents a plan of the rod $L'$, removed from its bearing in the bracket L. Figs. 36 and 37 represent, respectively, an elevation and a transverse section of the lower feed-roll, drawn to an enlarged scale. Figs. 38 and 39 are respectively a side elevation and plan of the fastener-bending plate, drawn to an enlarged scale.

In the drawings, A is a column having three legs $A'$, upon which it stands and by which it may be secured to the floor. To the rear of the column A is pivoted a lever $A^2$, extending toward the front of the machine and having pivoted to its front end a foot-pad $A^3$, provided with the tapered fulcrum-pin $A^4$, fitted to a hole in the front end of the lever $A^2$, in such a manner that said pad may be moved about its fulcrum $A^4$, either in a horizontal or a vertical plane, the object of which will be hereinafter more fully described.

To the rear end of the lever $A^2$ is pivoted a vertically-sliding bar $A^5$, having a bearing at its upper end in the projection $A^6$ from the rear of the column A and having loosely mounted upon a stud set therein a wedge-shaped roller $A^7$, which is so constructed and located that when the treadle-lever $A^2$ is depressed by the operator the beveled edge thereof is forced between the beveled ends of the collar $a$ and the hub of the driving-pulley $A^8$, loosely mounted upon the shaft $A^9$, and presses said pulley into contact with the friction-disk $A^{10}$, secured to the said shaft $A^9$, so as to cause said shaft to revolve, and thus transmit motion to the mechanism for lasting the upper, the shaft $A^9$ also having secured thereon a pulley $A^{11}$, which transmits power through a straight belt (not shown) to the pulley B upon the head of the machine. Directly above the pulley $A^{11}$ is pivoted a brake-shoe $A^{12}$, having its operating-face covered with leather or other suitable frictional material in any well-known manner, and the arm $A^{13}$, extending from said brake-shoe $A^{12}$, is connected by the rod $A^{14}$ to the rear end of the treadle-lever $A^2$ in such manner that when the treadle is depressed to start the machine the brake-shoe $A^{12}$ will be thereby removed from contact with the pulley $A^{11}$, a spring $A^{15}$ at the front of the column A raising the treadle-lever $A^2$ and bringing the parts into their normal positions as soon as the foot has been removed from the foot-pad $A^3$.

To the top of the column A is secured the frame $B'$ of the head of the machine. In the frame $B'$ is mounted the main shaft $B^2$, upon the rear end of which is secured the pulley B, heretofore mentioned, by which motion is imparted to the various mechanisms. The shaft $B^2$ also has secured thereon between the front and rear uprights of the frame the four cams $C\ C'\ C^2\ C^3$, while to its front end are secured the cams $C^4$, $C^5$, and $C^6$.

In the front end of the frame $B'$ is a groove, to which is fitted the vertically-moving bar D, the lower end of which is split and has securely clamped therein by a suitable collar and set-screw the driver $D'$ in a well-known manner. To the upper end of the bar D is secured the flanged coupling $D^3$, to which the rod $D^4$ is secured, said rod $D^4$ having a bearing in the adjustable bushing $D^5$, mounted in the upper end of the slotted stand $D^6$, secured to the top of the front end of the head-frame $B'$.

Between the bushing $D^5$ and the coupling $D^3$ and surrounding the rod $D^4$ is a coiled spring $D^7$, which is sufficiently powerful to move the bar D downward and drive the fastening into the shoe being lasted at the proper time, this being regulated by the face-cam $C^4$, which engages with a block $D^8$, projecting from the front of the bar $D'$ in the path of said cam $C^4$. The cam $C^4$ is so constructed that as soon as the fastening is driven it immediately commences to raise the bar D and its driver preparatory to another downward movement. The tension of the spring $D^7$ may be regulated by adjusting the bushing $D^5$, which may then be secured in position by the check-nut $D^9$. The broad flat base of the flanged coupling $D^3$ in its downward movement engages with the leather packing $D^{10}$, as shown in Fig. 9, to deaden the noise and jar when the hammer drops.

To the right-hand side of the frame $B'$, in bearings $b\ b'$, is mounted in an inclined position a rod $b^2$, the lower end of which is provided with a sharp steel point $b^3$ to engage with the inner sole on the last and hold the same in position while the gripping and pulling of the upper are being accomplished. The rod $b^2$ has secured thereon between the bearings $b\ b'$ a collar $b^4$, between which and the bearing $b$ the spring $b^5$ is mounted and serves to depress the rod when the arm $b^6$, secured to said rod $b^2$, is released from the cam $C^5$, the adjustable nut $b^7$ limiting the downward movement of said rod $b^2$. The cam $C^5$ must be so constructed and arranged as to allow the point $b^3$ to drop and engage with the inner sole before the jaws or pinchers have completed their grip upon the upper and commenced to pull thereon, and said point must remain in the inner sole until said pulling is finished.

In suitable bearings in the front and rear uprights of the head-frame $B'$ is mounted a sliding rod E, to the front end of which, between the adjustable nuts E' E', is secured the vertical bar or frame F, having in its upper end a suitable bearing to fit the guide-rod $E^2$, projecting from the front of the head-frame B', for the purpose of keeping said bar in an upright position. The rod E has loosely mounted thereon the cam-lever $E^3$, between the collars $E^4$ $E^4$, secured to said rod, the upwardly-projecting arm of said lever $E^3$ engaging with the path-cam $C^2$, made, preferably, in two parts, while the outwardly-projecting arm has secured thereto the upper end of a rod $E^5$, the lower end of which has a bearing in the stand $E^6$, secured to the base of the column A. (See Fig. 5.) To the stand $E^6$ is pivoted an L-shaped lever $E^7$, held in position by the spring $E^8$ and stop $E^9$, (see Fig. 8,) so that the end of the rod $E^5$ rests upon the end of the upright or vertical arm of said lever when in its normal position. Between the rear bearing of the rod E and one of the collars $E^4$ is coiled a spring $E^{10}$, which forces the rod E and the bar F toward the front of the machine when permitted to do so by the cam $C^2$. The cam $C^2$ is a cylinder path-cam of peculiar construction, it having a throw of such a pitch and depth as will move the lever $E^3$ and rod E toward the rear of the machine and with it the pincher-carrying bar F, this movement being sufficient to move the points of the pinchers into a position to grip the upper of the boot or shoe being lasted. The bar F remains in this backward position a sufficient length of time to allow the pinchers to close and get a firm grip upon the upper, when the receding surface 2 of said cam releases the lever $E^3$ and the spring $E^{10}$ forces the said lever and the bar F again toward the operator, the lesser portion of its forward movement giving a pull upon the upper, and then after a slight standstill the receding surface 3 allows the bar F to move still farther toward the front into its normal position ready to repeat the operation. During the standstill above referred to between the receding surfaces 2 and 3 of the cam the fastening is driven and the jaws or pinchers immediately release their grip upon the upper, and then almost at the same time the rod $b^2$ is raised and the prick-point is removed from the inner sole.

To the lower end of the bar F is adjustably secured by a suitable screw and slot the arm F', so that it may be moved toward or from the head of the machine, and has pivoted thereto the lower pincher-jaw $F^2$, made as two separate levers. To the lower end of said bar F is also pivoted the bifurcated saddle $F^3$, carrying the upper jaw $F^4$, said saddle $F^3$ being kept in a raised position by the spring $F^5$. (See Fig. 2.)

In grooves in rearwardly-projecting ribs upon the bar F is mounted the rectangular sliding block $F^6$, which is normally held in an elevated position by the spring $F^7$. To the lower end of the block $F^6$ is pivoted the four-armed lever $F^8$, one arm of which projects upward from its pivotal connection, while the other three project downwardly therefrom, the outer arms of those projecting downwardly engaging with the saddle $F^3$ when said lever $F^8$ is in its central position, as shown in Fig. 12, in which position it is held by the springs $F^{10}$ $F^{10}$, secured to the sides of the bar or frame F and having their lower ends bent toward each other at right angles, or nearly so, to their main bodies. The block $F^6$ has adjustably secured thereon the cam-block $F^9$, the upper end of which projects to the rear and is curved upon its upper side so that when said block is in its lowermost position it will fit the periphery of the cam $C^6$, with which it engages when the bar F has been moved to the rear. The revolution of the cam $C^6$ depresses the blocks $F^6$ $F^9$ and with them the lever $F^8$, thus moving the saddle $F^3$ downward and causing the jaw $F^4$ to move toward the jaws $F^2$ and grip the upper and retain said grip until the completion of the pull.

The cam-block $F^9$ has mounted therein two pins $ff$, having beveled inner ends to engage with the beveled sides of the upwardly-extending arm of the lever $F^8$, said pins being pressed outward by the springs $f'f'$. Should either one of these pins $f$ have pressure brought to bear thereon, its beveled inner end, acting upon the lever $F^8$, will move that lever into the position shown in Fig. 13, or the reverse, as the case may be, and when the lever $F^8$ is then moved downward its central lower arm will engage with the outer end of one of the side jaws $F^2$ $F^2$ of the pinchers and elevate its working end a greater distance, while the saddle $F^3$ is also engaged and depressed a lesser distance than when said lever is in its central position, one of the outer arms of said lever $F^8$ engaging with the shoulder $f^2$ on said saddle $F^3$ in order to accomplish this.

The side jaws $F^2$ $F^2$ are used independently only when lasting the toe portions of the upper, where it is obvious there is more slack of leather to be lapped over upon and secured to the inner sole. By means of these side jaws $F^2$ $F^2$ the leather of the upper is pulled upward and inward toward the center of the last at the same time it is being pulled over the last by the forward movement of said pinchers, the forked slide G acting in conjunction therewith to assist the gripping, pulling, and laying the leather in neat folds flat upon the sole, so that the fastening may be driven. When the upper along the side of the last, where there is not so much slack leather to be lapped, is being operated upon, both side jaws $F^2$ $F^2$ act as one solid jaw, each having a projecting portion, which bears upon the inner beveled end of the arm F', and are held in position by the spring $f^3$, secured to the under side of the bar F', as shown in Figs. 9, 13, 14, and 16. The pins $ff$ are operated upon, when desired, by the T-shaped lever $F^{11}$, fulcrumed upon the bearing $b'$, (see Figs. 4, 9, and 11,) the downwardly-projecting arm being held in its normal position central between said pins, so as not to engage therewith, by the short arms or levers $f^4$, secured upon the shaft $f^5$, mounted in the front end of the head-frame B', the ends of said arms $f^4 f^4$ projecting beneath the laterally-projecting arms of the lever $F^{11}$ and being held in an elevated position by means of the spring $f^6$, all as shown in Figs. 3 and 4. When it is desired to last the corner of the toe, one of the lateral arms of the lever $F^{11}$ is depressed, and the downwardly-projecting arm is thereby moved into the path of one of said pins $f$ $f$, and when the bar F is moved toward the rear said pin will be forced into contact with and move the lever $F^8$, as before described. The right or left lateral arm of the lever $F^{11}$ is depressed according to whether it is desired to last the left or right hand corner of the toe, it being preferable that the plaits or laps in the upper-leather should be laid toward the center of the last. The outer end of the lateral arms of the lever $F^{11}$ have pins or arms $f^7$ projecting therefrom toward the rear of the machine, to which arms the rods $f^8 f^8$ are secured, said rods being connected at their lower ends to the levers $f^9 f^9$, pivoted to the base of the column A, by depressing which said lever $F^{11}$ may be operated.

The wire from which the fastening is made is furnished in coils, one of which is placed upon the adjustable skeleton-like reel H, mounted upon the arm or bracket H', extending from the column A. The wire is fed between the feed-wheels $H^2 H^3$ to the cutting device, where it is cut into the lengths desired. The feed-wheel $H^2$ is secured upon a short shaft $H^4$, mounted in a bearing in the slide I, to the opposite end of which shaft is keyed a disk $H^5$, somewhat smaller in diameter than the inner diameter of the barrel $H^6$, loosely mounted upon said shaft $H^4$, as shown in Figs. 20 and 21. In a radial slot $h$ in the rear side of said barrel $H^6$ is clamped a stud $h'$, as shown in Figs. 24, 25, and 29. On this stud $h'$ is mounted one end of a rod $h^2$, connected at its opposite end to the pin $h^3$, mounted in the sliding blocks $h^4 h^5$, (see Fig. 30,) the latter of which is adapted to slide in a slot in the bar or lever $I^9$ and the former in a slot in the curved lever $H^7$, pivoted at $h^6$ to the frame B' and having mounted thereon the truck $h^7$, against which the cam C' acts to raise said lever $H^7$. The inner periphery of the barrel $H^6$ has cut therein the tangential notch $h^8$, in which there is a loose disk $H^8$, (shown in dotted lines in Fig. 29,) so constructed and arranged that when the rod $h^2$ is raised the disk $H^8$ will impinge upon the disk $H^5$ and turn said disk and its shaft a given distance, which will be determined by the distance of the pin $h^3$ from the pivot $h^6$, it being obvious that the farther the pin $h^3$ is from said pivot the more movement will be given to the various parts and the greater the length of wire which will be fed.

The slide I has secured thereon the devices for cutting the wire and is mounted in suitable guides in the stand I', secured adjustably to the frame B'. To said slide I, in a suitable chamber, is pivoted the cutting-shear lever $I^2$, pressed upward by the spring $I^3$ and having adjustably secured to its inner end the steel cutting-tool $I^4$, which, in conjunction with the fixed blade $I^5$, serves as shears to cut the wire in proper lengths. Above the fixed blade $I^5$ is secured another plate $I^6$, in the inner lower corner of which is formed a groove $h^9$, through which the wire is guided from the feed-rolls $H^2 H^3$, as shown in Fig. 28. In a bearing in the stand I' is mounted a pin $I^7$, its lower end engaging with the upper side of the cutting-lever $I^2$, while upon its upper end rests the head of the screw $h^{10}$, adjustably set in the lever $I^8$, pivoted to the stand K, as shown in Fig. 29. The upper surface of said lever $I^8$ bears against the periphery of the cam $C^2$, upon which there is a cam projection $C^7$, which at the proper time depresses the lever $I^8$, the rod $I^7$, and the cutting-lever $I^2$ and severs from the wire by an oblique cut the required length to form a fastening. The portion of wire thus severed is seized between the upper end of the lever $k$ and the plate $k'$, adjustably secured to the bar K', which is mounted in bearings in the frame B' and the stand K, and is provided at its upper end with a truck $K^2$, which is acted upon by the path $K^3$ of the cam $C^3$ to raise and lower said bar at the proper times, as shown in Figs. 18 and 19. The lever $k$ is curved, as shown in Fig. 19, and is pivoted to the plate $k'$ in a slot cut therein and has its gripping end pressed into contact with said plate by the spring $k^4$, the lower end of said lever $k$ projecting beyond the edge of said plate, so that when said bar K' is raised the inclined lower end of the lever $k$ will come into contact with the plate $k^5$, secured to the under side of the frame B', and will be thereby pressed into the slot in the plate $k'$ and raise its upper end, so that it shall release its grip upon the severed portion of the wire and be moved to one side thereof, all as shown in Figs. 18 and 19. The rearward portion of the plate $k'$ and the lever $k$ are of suitable thickness to allow them to pass into the narrow part of the T-shaped groove $g$ in the forward end of the sliding bar G' during the upward movement of the bar K', and in so doing the wire is bent around the upper end of the reduced rear portion of the plate $k'$ into the form of a staple, with its prongs extending downward within the broader portion of said groove or pocket $g$ and the grooves $k^3$ in the sides of the plate $k'$. When the lever $k$ releases its grip upon the fastening and descends, the friction between said fastening and the sides of the groove $g$ of the carrier G' will be sufficient to retain it in its position in said groove while it is carried by the bar G' to its position beneath the driver. The plate $k'$ in lifting the cut portion of the wire first brings it in contact with the cutting-blade $I^4$, and therefore it becomes necessary to have a similar shoulder upon the opposite side of said plate $k'$ and at the same distance from the center in order that both ends of the severed piece of wire may be acted upon alike, and to this end the lever $l$ is pivoted to the under side of the frame $B'$ at $l'$, its rear end being connected to an arm $l^2$, secured to the slide I, so that when said slide is moved toward or from the center of the plate $k'$ and groove $g$ the front end of the lever $l$ will be moved in the opposite direction the same distance, all as shown in dotted lines in Fig. 21.

It is obvious that the distance of the wire-severing cutter from the center of the machine must be proportioned to the length of the wire to be severed, and therefore when the length of the feed is increased or decreased the cutting-tool must be moved away from or toward the center of the groove $g$ a distance equal to one-half of the increase or decrease of the feed—that is, if a certain length is being cut and it is desired to cut a wire one-quarter of an inch longer the cutting devices should be adjusted only one-eighth of an inch farther from the center of the machine. This is accomplished by the slotted lever $I^9$, fulcrumed to the stand $I'$ at $i$ and connected to the slide I by means of the pin $I^{10}$, while in the slot in its upper end is mounted the sliding block $h^5$ upon the pin $h^3$, so that the block $h^5$ is free to move in said slot whenever the lever $H^7$ is raised by the cam $C'$, all as shown in Figs. 27, 28, and 29. To the upper end of said lever $I^9$ is pivoted a sleeve L, having mounted therein a rod $L'$, which is secured therein by means of a pin $L^2$ and a series of holes formed in said rod, (see Fig. 35,) and by which it may be adjusted endwise therein. The sleeve L has projecting downward therefrom an arm $L^3$, in which is mounted the adjustable stop-screw $L^4$, by which the inward movement of the lever $I^9$ is limited by the point of said screw coming in contact with the frame $B'$, as shown in Fig. 27. The rod $L'$ projects through a slot $L^5$ in the standard $L^6$, secured to the upper part of the frame $B'$, and to this standard is pivoted a latch-lever $L^7$, which has a stud $L^8$ projecting therefrom, upon which is mounted a rod $L^9$, by which it may be depressed against the tension of the spring $L^{10}$, the pins $l^3$ $l^4$ limiting the upward and downward movement of said latch-lever $L^7$, as shown in Fig. 3. In a bearing in the standard $L^6$ beneath the rod $L'$ is mounted a vertical rod M, which is pressed upward by the spring $M'$, the pin $l^5$ limiting its upward movement, and by this upward movement of the rod M the rod $L'$ is maintained in its elevated or normal position with the arm $L^3$ of the sleeve L raised out of the path of the lug $C^8$ upon the side of the cam C (see Figs. 26, 31, and 32) until the latch-lever $L^7$ is depressed by a downward movement of the rod $L^9$. This is the normal position of the parts when operating upon the sides of the shoe; but when the heel and toe portions are being operated upon it is obvious that a longer fastening should be used, and this is accomplished by depressing the latch-lever $L^7$, thereby lowering the rod $L'$ and arm $L^3$, so that said arm comes into the path of the lug $C^8$, and is struck thereby and moved to the left of the machine, thus moving the slide I farther from the center of the machine and moving the pin $h^3$, also, farther from the pivot $h^6$, so that when the lever $H^7$ is raised by the next revolution of the cam $C'$ a greater length of wire will be fed and cut. The length of the shorter fastenings may be regulated by the stop-screw $L^4$, while the length of the longer fastenings may be regulated by the adjustment of the rod $L'$ in the sleeve L, said rod $L'$ being held in its outward position when once moved by the lug $C^8$ by the latch-lever $L^7$ shunting by its end and preventing its being moved to the right by the spring N as long as the operator sees fit to keep said latch-lever $L^7$ depressed; but as soon as said latch-lever $L^7$ is released it is raised by the spring $L^{10}$, the rod $L'$ is moved to the right by the spring N, while the spring $M'$ raises the rod M and lifts the said rod $L'$ and the sleeve L, so that its arm $L^3$ is out of the path of the lug $C^8$, when the shorter lengths of wire will again be cut. The lever $H^7$, having been raised by the cam $C'$, is lowered again by the cam-segment $C^9$, secured to the inner end face of the cam C and acting by its inner curved face upon the truck $h^7$ of said lever $H^7$. By this arrangement whenever the feed is adjusted a given distance the same operation causes the slide carrying the cutting devices to be moved one-half of said distance. The lower feed-roll is mounted upon a separate block O, secured to the slide I, so that the feed-rolls may be adjusted slightly toward or from each other, the lower feed-roll $H^3$ being driven by means of the upper feed-roll $H^2$, both being provided with gears for this purpose, as shown in Figs. 27, 36, and 37. The groove in the lower feed-roll is corrugated or toothed, so that the wire in passing between the feed-rolls has formed in its under side a series of indentations extending transversely thereof for the purpose of presenting a greater resistance to the withdrawal of the fastening when once inserted in the material, as shown in Fig. 37.

To the frame $B'$, over the cam C, is pivoted a brake $O'$, constructed and arranged to rest upon and act as a friction-pawl to prevent the shaft B being revolved in the wrong direction.

To the rear end of the frame $B'$, below the cam C, is secured a vertical stud P, upon which is mounted a lever $P'$, to which the lever $P^2$ is adjustably secured, so that both will oscillate about the same fulcrum P, but may be adjusted slightly one upon the other by the pin $P^3$. The movable end of the lever $P^2$ is provided with a truck $P^4$, which engages with the cam C, by which motion is imparted to said lever and to the lever $P'$, in the outer end of which is a pin $P^5$, which is connected by the link $P^6$ to a pin $P^7$ in the slide $G'$, fitted to and movable endwise in a groove in the fork-ended slide G, which in turn has bearings in the lower portion of the frame $B'$, and is adapted to be moved toward the pinchers when the front end of said slide $G'$ is moved into contact with an abutment near the front end of said slide G, as shown in Figs. 21 and 26. The slide G has just sufficient movement to co-operate with the pinchers and give the pull upon the upper and lay the leather in position for nailing it to the sole. The slide $G'$, however, has considerable more movement than the slide G, it being necessary to move said slide sufficiently far to the rear to receive the fastening and then move with it into a position beneath the driver, thus making considerable lost motion between the two slides G $G'$, and in order that when the two come into contact there may not be too much jar a slot Q is cut horizontally through the slide $G'$, near its rear end, in which is mounted a block $Q'$, somewhat shorter than said slot, and this block $Q'$ is held in a central position normally by the springs $q\ q$, as shown in Figs. 21 and 22. The block $Q'$ is provided with a projection $Q^2$, which comes into contact with the shoulders $q'\ q'$ upon the slide G to ease the jar when the two come in contact in moving in either direction.

In the front end of the machine is a set-screw $q^2$, projecting into a slot in the slide G, to limit its movement in either direction.

Beneath the slide G is adjustably secured in a bearing in the rear portion of the head-frame $B'$ a gage R, which extends horizontally nearly to the front of said frame $B'$ and is provided in its front end with a socket in which is mounted a block of rubber $R'$, against which the side of the last is placed, and serves to gage the distance of the line of fastening from the corner of the last and prevents the upper being injured by contact with metal when said upper is being lasted. When the upper along the sides of the last is being operated upon, the operator must depress the heel end of the foot-pad $A^3$ so that it will assume the position shown in dotted lines in Fig. 8 and then depress the treadle-lever while said foot-pad is in this position, when the pincher-bar F will move backward and forward, as described, and a short length of fastening or nail will be cut from the wire and driven. When the heel portion of the upper is to be operated upon, there is no necessity of pulling the leather by the pinchers, and therefore the operations of said pinchers may be arrested and the leather bent over upon the inner sole by the forward movement of the slide G. The arresting of the operations of the pinchers is accomplished by the treadle-lever S, pivoted to the under side of the foot-pad $A^3$ at $S'$ and having an arm $S^2$ projecting upward through a slot in the foot-pad $A^3$ a short distance above the upper surface of said pad, while the movable end of said lever S is expanded laterally, so that some portion thereof always remains above the movable end of the lever $E^7$, pivoted to the stand $E^6$ and held in position by the spring $E^8$ and stop $E^9$, so that its upright or vertical arm will be directly beneath the rod $E^5$, secured to the outer end of the cam-lever $E^3$ on the rod E, and operated by the cam $C^2$, as has been described. When the rod $E^5$ is bearing upon the vertical arm of the lever $E^7$, the revolution of the cam $C^2$ operates upon the lever $E^5$ to move the rod E lengthwise of its axis; but when the operator depresses the toe end of the foot-pad $A^3$ and the lever S by pressing upon the arm $S^2$ and at the same time depresses the main lever $A^2$ the shaft $B^2$ will be revolved, and simultaneously the lever $E^7$ will be depressed, so that the vertical arm of said lever $E^7$ will be removed from beneath the rod $E^5$, so that when the throw of the cam $C^2$ comes into contact with the lever $E^3$ said lever will not be moved endwise of the shaft or rod E; but it will be moved about said rod out of the path of said cam $C^2$, the rod $E^5$ being thereby moved downward in its bearing in the stand $E^6$ against the tension of the spring $S^3$, interposed between said stand and the collar $S^4$, secured to said rod $E^5$. By this arrangement the machine will continue to operate while the pincher mechanism is at a standstill as long as the treadles $A^2$, $A^3$, $E^7$, and S are depressed, as above described; but as soon as the pressure is removed from said treadle the spring $S^3$ raises the rod $E^5$ and the lever $E^3$ into their normal position, the spring $E^8$ raises the lever $E^7$ into its normal position against the stop $E^9$, the spring $A^{15}$ raises the main treadle-lever into its normal position, and a spring $S^5$, (see Figs. 7 and 8,) connecting downwardly-projecting arms, one upon the foot-pad $A^3$ and the other upon the pivoted end of the treadle-lever S, brings that lever again into its normal position; but while the heel is being operated upon a longer fastening should be used, as there is the additional thickness of the stiffener through which said fastening must pass. In order to accomplish this, an arm T is adjustably secured to the rear end of the foot-pad $A^3$ in such position that when said pad is in the position shown in full lines in Fig. 8 and the lever $A^2$ is depressed the arm T will engage with and depress the lever $T'$, pivoted at $T^2$ to the column A, and through the connecting-rod $L^9$ the lever $L^7$ is depressed for the purpose of adjusting the feed and cutting mechanism so that a longer fastening will be cut, as has been described.

When the toe portion is being lasted and it is desired to operate one of the side jaws $F^2 F^2$ of the pinchers, the foot-pad $A^3$ is moved about its fulcrum-pin $A^4$, so that one of the shoulders U U upon the upwardly-extending rear end $U'$ of the said foot-pad $A^3$ will come into the plane of movement of one of the levers $f^9\ f^9$, so that when said pad $A^3$ and the lever $A^2$ are depressed one of the levers $f^9\ f^9$ will also be depressed and through the rods $f^8 f^8$ will trip the lever $F^{11}$, so that it will operate the pincher mechanism, as already described. When either of said levers $f^9 f^9$ is depressed, the lever T′ should also be depressed by the arm T in order to give a longer nail or fastening, which is necessary when the toe is being operated upon, owing to the additional thicknesses of leather occasioned by plaiting which must be secured to the sole. The arrangement of the treadle pads and levers is such that either the lever $A^2$ may be depressed alone by depressing the heel end of the pad $A^3$ or said lever may be depressed in conjunction with either of the levers $f^9 f^9$ or the lever $E^7$; but whenever either of the levers $f^9 f^9$ or the lever $E^7$ is depressed the lever T′ must also be depressed, and never should either of the levers $f^9 f^9$ or $E^7$ be depressed alone or with the lever $A^2$ alone; but the lever T may sometimes be used with lever $A^2$ to give a longer fastening in straight work.

In the operation of the machine the wire is fed by the feed-rolls $H^2 H^3$ to the cutting devices, where it is cut into lengths which have been predetermined. Each length is in turn seized at its center and lifted into the groove $g$ in the front end of the slide G′, the wire being being bent into a U shape in the operation. In the meantime the pincher-carrying bar F has been moving to the rear, and when the pinchers have entered the forked end of the slide G the jaws are clamped upon the upper and the prick-point $b^3$ drops and enters the sole. The fastener-carrying slide G′ then moves toward the front until it reaches the abutment in the slide G, when both move together and with them the jaw-carrying bar F, the pull upon the leather being given. When the groove $g$ has arrived at a position beneath the driver D′, the slides G G′ and block F stop in their movements and the driver descends and drives the fastening. The driver is immediately raised and the point $b^3$ is removed from the sole, and then the slide G′ moves to the rear and after a short movement moves the slide G to its normal position, and at the same time the pinchers are allowed to release their grip and move to their forward or normal position ready for a repetition of the operation.

I claim—

1. In a lasting-machine, the combination of a horizontally-reciprocating bar or frame, an arm secured to said bar or frame, an upper pincher-jaw pivoted to said bar or frame, two jaw-levers pivoted one to each side of said arm and adapted to operate either in conjunction therewith as a single rigid jaw or independently thereof, according to the style of work desired to be done, a spring for holding said lower-jaw levers in position to operate in conjunction with said arms as a rigid jaw, mechanism for moving said main pivoted jaw about its pivot to open said pinchers, mechanism for moving said main pivoted jaw about its pivot to co-operate with one or both of said lower-jaw levers to grip the upper and retain a grip thereon while the upper is being drawn over the inner sole, mechanism for moving one or the other of said side jaws about its pivot when desired to raise its operating end and cause it to co-operate with said upper jaw and draw the upper inward at a higher level, thereby forming a crimp of the slack leather, and mechanism for feeding and driving a fastening to secure said upper to the inner sole when the pull thereon has been completed.

2. In a lasting-machine, the combination of a horizontally-reciprocating bar or frame, a lower pincher-jaw secured to said bar or frame, an upper jaw pivoted to said bar or frame and adapted to co-operate with said lower jaw, a spring for moving said upper jaw about its pivot and holding said jaw away from the lower jaw during the movement of said pinchers toward the shoe-upper to be lasted, a cam, a vertically-reciprocating block mounted upon said pincher-carrying bar or frame and operated by said cam, a lever carried by said block and constructed and arranged to engage with said pivoted jaw and move it about its pivot to co-operate with said rigid jaw and grip the upper of the shoe being lasted and retain said grip during a portion of the reverse movement of said pinchers, and a nailing mechanism for securing said upper to the inner sole when the pull thereon has been completed.

3. In a lasting-machine, the combination of a horizontally-reciprocating pincher-carrying bar or frame, a rigid arm secured to said bar or frame, two side-jaw levers pivoted to said rigid arm, a spring to hold said side jaws in positions to act in conjunction with said arm as a rigid jaw when desired, an upper pincher-jaw pivoted to said bar or frame and adapted to co-operate with said side-jaw levers, a spring for moving said upper jaw away from said lower jaws and holding said jaws open during their movement toward the shoe-upper to be lasted, a cam, a reciprocating block operated by said cam, a lever pivoted to said block and provided with three downwardly-projecting arms, two of which are adapted to engage, together or separately, with some portion of the said upper jaw, while the other arm is constructed and arranged to engage with one or the other of said side-jaw levers to raise it to a higher level when it is desired to have said upper jaw co-operate with only one of said side-jaw levers, mechanism having provision for moving said lever about its fulcrum, and a nailing mechanism for securing said upper to the inner sole when the pull thereon has been completed.

4. In a lasting-machine, the combination of a horizontally-reciprocating pincher-carrying bar or frame, a rigid arm secured to said bar or frame, two side-jaw levers pivoted one to each side of said rigid arm, a spring to act upon both of said side-jaw levers and hold them normally in positions to act in conjunction with said rigid arm and to form a single rigid jaw when desired, an upper pincher-jaw pivoted to said bar or frame and adapted to co-operate with both of said side jaws as a single rigid jaw or with either of said side-jaw levers independently, as may be desired, a spring for moving said upper jaw about its pivot to open said pinchers and hold them open during the movement of said pinchers toward the shoe-upper to be lasted, a cam, a reciprocating block operated by said cam, a lever pivoted to said block and provided with three downwardly-projecting arms, and one upwardly-projecting arm having a wedge-shaped cross-section, the two outer of said downwardly-projecting arms engaging when said lever is in its central position with said upper jaw to move it a predetermined distance about the pivot and cause it to co-operate with both of said side jaws in their normal positions and acting as one rigid jaw to grip and pull the upper, and when said lever is moved about its fulcrum one or the other of said outer downwardly-projecting arms will engage with said pivoted jaw at a different level and move it a lesser distance, while the central downwardly-projecting arm at the same time will engage with one or the other of said side-jaw levers to raise its operating end to co-operate with the upper jaw to grip the upper and pull it in laps over the inner sole, two spring-operated pins mounted in bearings in said reciprocating block, one on either side of the center of the wedge-shaped upwardly-projecting arm of said lever, an adjustable stop or abutment adapted to be moved into the path of one or the other of said pins and to be engaged thereby to force it against the beveled side of the upwardly-projecting arm of said lever to move it about its fulcrum, and mechanism having provision for moving said stop into or out of the path of one or the other of said pins, so that either or neither of them may be engaged thereby at the desire of the operator.

5. In a lasting-machine, the combination of a horizontally-reciprocating pincher-carrying bar or frame, a rigid arm secured to said bar or frame, a jaw-lever pivoted to each side of said rigid arm, a spring to hold both of said jaw-levers in position to act in conjunction with said arm to form a single rigid lower jaw when desired, an upper pincher-jaw pivoted to said bar or frame and adapted to co-operate with both of said lower-jaw levers when acting as a single rigid jaw or with either of said side jaws independently, as may be desired, a spring for moving said upper jaw about its pivot to open said pinchers and hold them open during their movement toward the shoe-upper to be lasted, means having provision for moving said upper jaw about its pivot to co-operate with one or both of said jaws to grip the upper and retain a grip thereon during a portion of the reverse motion of said pinchers, means having provision for moving one of said lower-jaw levers about its pivot, when desired, to raise its gripping end and cause it to co-operate with said upper jaw and pull the gripped portion of the upper upward and then toward the center of the sole, thereby forming a fold or lap of the slack leather, and a horizontally-reciprocating slide provided with a forked or notched end to co-operate with said pinchers to assist in forming said fold and laying it upon the inner sole.

6. In a lasting-machine, the combination of a horizontally-reciprocating pincher-carrying bar or frame, a pair of pincher-jaws mounted thereon, a horizontal guide rod or bar carrying said bar or frame and fitted to and movable endwise in suitable fixed bearings, an arm mounted upon said rod, a cam constructed and arranged to act upon said arm to move said rod and bar or frame in one direction to allow said pinchers to grip the upper, and a spring for moving said rod and bar or frame in the opposite direction to strain the leather over the inner sole preparatory to securing it thereto.

7. In a lasting-machine, the combination of a pincher-carrying bar or frame, a pair of pincher-jaws mounted thereon, a horizontal rod firmly secured by one end to said pincher bar or frame and fitted to and movable endwise in suitable fixed bearings, an arm mounted on said rod, a cam provided with a throw to act upon said arm to move said rod and the pincher bar or frame to a position to grip the upper, and also provided with two reverse throws to allow said bar to move in the opposite direction, and a standstill between said reverse throws of sufficient length to allow the fastening of the upper to the inner sole before the completion of the movement of the rod in that direction, and a spring for moving said pincher-carrying bar in said opposite direction.

8. In a lasting-machine, the combination of a horizontal rod fitted to and movable endwise in suitable bearings, a pincher-carrying bar or frame secured to said rod, an arm mounted on and movable about but not endwise on said rod, a cam provided with a throw to act upon said arm and move said rod and the pincher-carrying bar or frame in the direction of the length of said rod when said arm is held in its normal position, a spring for moving said rod in a direction opposite to the throw of said cam, and means having provision for moving said arm about said rod at the will of the operator.

9. In a lasting-machine, the combination of a horizontal rod fitted to and movable endwise in suitable bearings, a pincher-carrying bar or frame secured to said rod, a pair of pincher-jaws mounted on said bar or frame, a bell-crank lever mounted upon and movable about but not endwise on said rod, a cam engaging with one arm of said lever and adapted to move said lever about said rod to prevent the reciprocating movement of said pincher-carrying bar or to move said arm and the rod upon which it is mounted lengthwise of said rod to produce the said reciprocating movement of said pincher-carrying bar, a spring for moving said rod and its pincher-carrying bar in the opposite direction to produce the strain upon the leather, and a removable stop to prevent or permit the movement of said lever about said rod at the will of the operator.

10. In a lasting-machine, the combination of a horizontal rod mounted in suitable bearings, a pincher-carrying bar or frame secured thereto, a pair of pincher-jaws mounted on said bar or frame, a bell-crank lever mounted upon said rod, but immovable thereon relative to its length, a cam engaging with one arm of said lever and adapted to move said lever about said rod to prevent the reciprocating movement of said pincher-carrying bar or to move said arm and the rod upon which it is mounted lengthwise of said rod to produce the said reciprocating movement of said pincher-carrying bar, a spring for moving said rod and its pincher-carrying bar in the opposite direction to produce the pull upon the upper, a vertical rod secured to the horizontal arm of said lever, a stand provided with a bearing for the lower end of said rod, a lever pivoted to said stand and constructed and arranged to serve as a removable stop to limit the downward movement of said rod, a spring for holding said rod normally in its elevated position, a spring to hold said stop-lever in its normal position with its vertical arm under the said vertical rod, and a system of treadle-levers adapted to trip said lever when it is desired to prevent the reciprocating movement of said pincher-carrying bar.

11. In a lasting-machine, the combination of a horizontally-reciprocating bar constructed and arranged to turn the flap of the upper over upon the inner sole, a second bar or rod fitted to a slot in said first bar and provided with a nail or fastener receiving pocket, and means having provision for reciprocating the latter bar to carry the nail from the receiving-point to a position beneath the driver and at the same time move the other slide a sufficient distance to accomplish its object.

12. In a lasting-machine, the combination of a horizontal slide provided with a forked end, another slide provided with a nail-receiving pocket and arranged to in its movement move the first slide a sufficient distance to turn the upper over upon the last, a pivoted lever, a link connecting said lever and said second slide, a truck mounted upon the end of said lever, and a cam arranged to engage with said truck and transmit motion through it to said slides.

13. In a lasting-machine, the combination of a grooved horizontal slide provided with a forked end, another slide mounted in said groove and provided with a nail-receiving pocket and adapted in its movement to move the first slide a predetermined distance, a pivoted lever in two parts, one of which is adjustably secured to the other about the same pivot, a bar connecting one part of said lever with said second slide, a truck mounted upon the other part of said lever, and a cam arranged to engage with said truck and transmit motion through it to said slides.

14. In a lasting-machine, the combination of a horizontal slide provided with a forked end, another slide provided with a nail-receiving pocket and adapted in its movement to move the first slide a predetermined distance, a yielding connection between the two slides to prevent a too sudden contact, and means for reciprocating the nail-carrying slide.

15. In a lasting-machine, the combination, with a horizontally-reciprocating bar or frame, a pair of pincher-jaws carried thereby, means having provision for reciprocating said bar or frame and the pinchers, means having provision for opening and closing said pincher-jaws, and a horizontally-reciprocating fork-ended bar for pressing the upper down upon the inner sole, of a wire-feeding mechanism, a device for cutting the wire into the required lengths, a gripping mechanism for holding the portion thus cut, a bending mechanism for forming the cut-off portion into a staple, a horizontally-sliding bar provided with a pocket to receive said staple, a driving mechanism, and means having provision for moving said slide with its staple from the receiving-point to a position beneath the driving mechanism, and vice versa.

16. In a lasting-machine, the combination, with a horizontally-reciprocating bar or frame, a pair of pincher-jaws carried thereby, means having provision for reciprocating said bar or frame and the pinchers, means having provision for opening and closing said pincher-jaws, and a horizontally-reciprocating fork-ended bar for pressing the upper down upon the inner sole, of a wire-feeding mechanism, a device for cutting the wire, mechanism for adjusting the position of said cutting device to provide for cutting nails of different lengths, fingers to seize said cut-off portion, mechanism for bending the cut-off portion into a staple, a driving mechanism, a sliding bar provided with a pocket to receive the staple, and means having provision for moving said slide with its staple from the receiving-point to a position beneath the driving mechanism.

17. In a lasting-machine, the combination, with a horizontally-reciprocating bar or frame, a pair of pincher-jaws carried thereby, means having provision for reciprocating said bar and pinchers, means having provision for opening and closing said pincher-jaws, and a horizontally-reciprocating bar for pressing the upper down upon the inner sole, of a wire-feeding mechanism, mechanism for automatically regulating the length of wire fed, a wire-cutting device, and mechanism for automatically adjusting the position of said wire-cutting device to regulate the lengths of the nails or fastenings.

18. In a lasting-machine, the combination of a pair of nail-receiving jaws, mechanism for closing said jaws, a reciprocating slide provided with a nail-receiving pocket, and mechanism for lifting said jaws to deliver said nail into said pocket.

19. In a lasting-machine, the combination of a nail-delivering device, a vertically-reciprocating bar, a pair of jaws attached to said bar and adapted to receive said nail, a spring for closing said jaws, a horizontally-reciprocating slide provided with a nail or fastener receiving pocket, and mechanism for releasing the grip upon said fastener when in the upward movement of said bar the nail has been delivered into said pocket.

20. In a lasting-machine, the combination of a horizontally-reciprocating slide, mechanism for controlling the movement of said slide, a cutter secured to said slide, two feed-rolls also secured to said slide, a disk secured to the shaft of one of said feed-rolls, a cylinder loosely mounted upon said shaft and inclosing said disk, a tangential notch or recess cut in the inner perimeter of said cylinder, a friction-roll in said recess between said disk and the inner perimeter of said cylinder and adapted to serve as a means of connecting said cylinder and disk and compelling them to move together in one direction and to disconnect them when the cylinder is moved in the opposite direction, and mechanism for imparting to said cylinder an intermittently-oscillating movement about its shaft to a greater or less distance.

21. In a lasting-machine, the combination of a pair of feed-rolls, a disk secured to the shaft of one of said feed-rolls, a cylinder loosely mounted upon said shaft and surrounding said disk, a tangential notch or recess cut in the inner perimeter of said cylinder, a friction-roll interposed between said disk and said cylinder, a crank-pin set in the outer face of said cylinder, a horizontally-arranged lever provided with a longitudinal slot, a sliding block fitted to said slot, a rod connecting said block and said crank-pin, mechanism for moving said block in said slot a predetermined but variable distance, and a cam for vibrating said slotted lever.

22. In a lasting-machine, the combination of a horizontally-reciprocating slide, a pair of feed-rolls mounted on shafts carried by said slide, a disk secured to the shaft of one of said feed-rolls, a cylinder loosely mounted upon said shaft and surrounding said disk, a tangential notch or recess cut in the interior perimeter of said cylinder, a friction-roll interposed between said disk and said cylinder, a crank-pin adjustably set in said cylinder, a horizontally-arranged lever provided with a longitudinal slot, a cam for vibrating said lever, a sliding block mounted in the slot of said lever, a fulcrum-pin mounted in said block, a rod connecting said fulcrum-pin and the crank-pin in said cylinder, a vertically-arranged lever mounted on a fixed fulcrum and connected to said horizontal slide and provided in its upper end with a longitudinal slot, a second sliding block fitted to the slot in said vertical lever and mounted on said fulcrum-pin, a cutting device secured to said horizontally-reciprocating slide, a sleeve pivoted to the upper end of said vertically-arranged lever and provided with a downwardly-projecting arm, a spring for keeping said sleeve in its elevated position, a revolving segmental block or lug, a stop to limit the movement of said sleeve and said slotted arm in one direction, means for depressing said arm into the path of said revolving segmental block or lug to cause said slotted lever to be moved in the opposite direction, and a stop to limit the movement of said lever in said opposite direction.

23. In a lasting-machine, the combination of a wire feeding and controlling mechanism, a wire-cutting mechanism, a pivoted horizontally-arranged lever provided with a longitudinal slot, a truck mounted thereon, a cam for moving said lever, a horizontally-reciprocating cutter-carrying slide, a vertically-arranged lever pivoted to a fixed support and to said slide and slotted at its upper end, two sliding blocks mounted in the slots in said two levers, a pin connecting said blocks, a rod connecting said pin with the wire feeding and controlling device, a sleeve pivoted to said vertically-arranged lever and provided with a downwardly-projecting arm, a revolving segment or lug adapted to come in contact with said arm and move it outward, a stop to limit the inward movement of said arm, a spring to keep said vertically-arranged lever normally in its innermost position, a spring for keeping said sleeve normally in an elevated position, a rod mounted in said sleeve, a latch constructed and arranged to shut down in front of said rod and hold it in its retracted position when said vertical lever has been moved outward by said revolving segment or lug, a spring to keep said latch normally in a raised position, a suitable treadle mechanism, and a rod connecting said treadle mechanism and said latch.

24. In a lasting-machine, the combination of a nearly-vertical lever for controlling the cutting devices, a nearly-horizontal lever for controlling the wire-feeding devices, a universal joint connecting said levers to enforce united action, a sleeve pivoted to said vertical lever and provided with a downwardly-projecting arm, a revolving segment or lug adapted to come in contact with and move said arm outwardly, a rod adjustably mounted in said sleeve to limit the length of the longer nails or fastenings, an adjustable stop to limit the length of the shorter nails, a vertically-arranged spring-supported rod forming a saddle for said adjustable sleeve-rod, a spring for normally holding said sleeve in its inner position, a pivoted spring-raised latch-lever adapted to shut down by the end of said adjustable sleeve-rod to hold it in its retracted position, a suitable treadle mechanism, and a rod connecting said treadle mechanism with said latch.

25. In a lasting-machine, the combination of a horizontally-reciprocating pincher-carrying bar or frame, a pair of pincher-jaws carried by said frame, a vertically-reciprocating block carried by said bar or frame, a multiple-armed lever mounted on said block and constructed and arranged to control the action of said pinchers, a pair of pins for operating said lever also carried by said block, an adjustable stop or abutment mounted on the frame of the machine-head and constructed and arranged to be normally held in a position intermediate between the path of said pins as they are moved to the rear, a treadle mechanism, and suitable connections between said treadle mechanism and said abutment whereby said stop or abutment may be moved into the path of either one or the other of said pins at the will of the operator.

26. In a lasting-machine, the combination, with a pair of horizontally-reciprocating pinchers, the vertically-sliding block $F^6$, the four-armed lever $F^8$, and the cam-block $F^9$, both carried by said sliding block $F^6$, the two pins $f\,f$, the springs $f'\,f'$, and the three-armed or T-shaped lever $F^{11}$, of a main treadle-lever, a spring to lift said lever, a foot-pad pivoted to said treadle-lever so that it can be moved either in a lateral or vertical direction, an upwardly-projecting arm formed upon said foot-pad and provided with a shoulder on each side thereof, a pair of levers fulcrumed upon the base of the machine and arranged one upon each side of said arm in positions to be engaged and depressed by said shoulders when desired, and rods connecting said levers with the horizontal arms of the lever $F^{11}$ for controlling the operation of the pinchers.

27. In a lasting-machine, the combination of a horizontally-reciprocating bar or frame, a pair of pinchers carried by said bar, a lever, cam, and spring for reciprocating said pincher-bar, a main treadle-lever, a foot-pad secured thereto, a lever pivoted to the under side of said foot-pad, an arm on said lever projecting upward through an opening in said pad, a spring to keep said lever in a normally-raised position, a stand secured to the base of the machine, a spring-raised rod having a bearing for its lower end in said stand and connected at its other end with the lever for controlling the reciprocation of the pincher-carrying bar, and a spring-actuated bell-crank lever, the vertical arm of which in the normal position of said lever forms a stop to prevent the downward movement of said rod, while the lateral arm lies in the path of the lever pivoted to said foot-pad and may be depressed thereby when desired.

28. In a lasting-machine, the combination of a horizontally-reciprocating bar or frame, a pair of pincher-jaws carried by said bar, the vertically-sliding block $F^6$, the four-armed lever $F^8$, and the cam-block $F^9$, both carried by said sliding-block $F^6$, the pins $f\,f$, the springs $f'\,f'$, the three-armed or T-shaped lever $F^{11}$, a lever, cam, and spring for reciprocating said pincher-carrying bar, a wire feeding and cutting mechanism, a main treadle-lever, a foot-pad pivoted thereto, so that it may be oscillated either laterally or vertically and provided with an upwardly-projecting arm having a shoulder upon each side thereof and an overhanging lip, a lever on each side of said arm constructed and arranged to be acted upon and depressed independently by said shoulders to control the operation of the pincher opening and closing mechanism, a lever constructed and arranged to be acted upon by said overhanging lip to control the wire feeding and cutting devices, a lever pivoted to the under side of said foot-pad, a spring for raising the movable end of said lever, and a bell-crank lever adapted to be depressed by said last lever to control the movement of the pincher-carrying bar.

29. In a lasting-machine, the combination of the shaft $B^2$, the cam $C^2$, mounted on said shaft, the horizontally-reciprocating rod E, a pincher-carrying bar or frame mounted on and movable horizontally with said rod, a two-armed lever mounted on and movable about said rod and adapted to be acted upon when in its normal position by said cam to reciprocate said rod and pincher-carrying bar or frame, a rod pivoted by one end to and pendent from the free end of the horizontal arm of said lever, a spring on said pendent rod tending to force it downward and vibrate said lever, a main treadle-lever for operating the clutch or shipping mechanism for starting and stopping the operations of the main shaft, and a lever constructed and arranged to serve as a stop and support for holding said pendent lever and the first-named two-armed lever in their normal positions and adapted to be moved from beneath said pendent rod by the operator's foot, while depressing said main treadle-lever, thereby causing a suspension of the reciprocation of the pincher-carrying bar and the operation of the pinchers.

In testimony whereof I have signed my name to this specification, in the presence of two subscribing witnesses, on this 30th day of March, A. D. 1892.

ISAÏE FRECHETTE.

Witnesses:
N. C. LOMBARD,
JAMES T. MURRAY.